United States Patent
Winter et al.

(10) Patent No.: US 12,453,299 B2
(45) Date of Patent: Oct. 28, 2025

(54) IMPLEMENT AND GROUNDS MAINTENANCE VEHICLE INCLUDING SAME

(71) Applicant: THE TORO COMPANY, Bloomington, MN (US)

(72) Inventors: Jerrod Neal Winter, Faribault, MN (US); Phat Toan Nghiem, Minnetonka, MN (US)

(73) Assignee: THE TORO COMPANY, Bloomington, MN (US)

( * ) Notice: Subject to any disclaimer, the term of this patent is extended or adjusted under 35 U.S.C. 154(b) by 559 days.

(21) Appl. No.: 17/752,100

(22) Filed: May 24, 2022

(65) Prior Publication Data

US 2022/0377961 A1 Dec. 1, 2022

Related U.S. Application Data

(60) Provisional application No. 63/193,161, filed on May 26, 2021.

(51) Int. Cl.
*A01B 45/00* (2006.01)
(52) U.S. Cl.
CPC .................... *A01B 45/00* (2013.01)
(58) Field of Classification Search
CPC ......... A01B 49/02; A01B 45/00; A01B 31/00; A01B 63/32; E02F 3/6454; E02F 3/6409
See application file for complete search history.

(56) References Cited

U.S. PATENT DOCUMENTS

| | | | | | |
|---|---|---|---|---|---|
| 4,217,962 | A | * | 8/1980 | Schaefer | E02F 3/6454 172/197 |
| 5,265,975 | A | * | 11/1993 | Scott | E01C 23/082 172/197 |
| 5,373,902 | A | * | 12/1994 | Lindblom | E02F 3/188 404/90 |
| 7,584,805 | B2 | * | 9/2009 | Skaggs | E02F 3/7604 172/445.2 |

(Continued)

OTHER PUBLICATIONS

Beacon Athletics, "PR72 Pro Infield Groomer (Tongue Towed)," retrieved from internet Apr. 27, 2023, https://beaconathletics.com/wp-content/uploads/2019/12/PR72-Pro-Infield-Groomer-Tongue-Towed-2023-1.jpg?x94492, 1 page.

(Continued)

*Primary Examiner* — Christopher J Sebesta
*Assistant Examiner* — Blake E Scoville
(74) *Attorney, Agent, or Firm* — Mueting Raasch Group

(57) ABSTRACT

Various embodiments of a ground working implement and a grounds maintenance vehicle that includes such implement are disclosed. The ground-working implement includes an implement frame and a tool carousel rotatably connected to the implement frame. The tool carousel includes a shaft and first and second operator-selectable ground-working tools extending outwardly from the shaft. The shaft extends along a carousel axis. The tool carousel is configured to rotate about the carousel axis and alternately lock in a first position, where the first ground-working tool is configured to contact a ground surface, and a second position, where the second ground-working tool is configured to contact the ground surface.

23 Claims, 26 Drawing Sheets

(56) References Cited

U.S. PATENT DOCUMENTS

| | | | | |
|---|---|---|---|---|
| 8,813,864 | B2* | 8/2014 | Layton | A01B 63/004 172/311 |
| 9,003,751 | B2 | 4/2015 | Lancaster | |
| 10,150,502 | B2 | 12/2018 | Kallevig et al. | |
| 10,287,744 | B1* | 5/2019 | Keigley | E02F 3/841 |
| 10,287,745 | B1 | 5/2019 | Keigley | |
| 10,375,873 | B2* | 8/2019 | Campbell | A01B 63/22 |
| 10,492,354 | B2 | 12/2019 | Keigley | |
| 10,501,912 | B2* | 12/2019 | Keigley | E02F 3/7677 |
| 10,765,053 | B1 | 9/2020 | Keigley | |
| 2018/0230674 | A1* | 8/2018 | Keigley | A01B 31/00 |
| 2022/0379947 | A1 | 12/2022 | Winter et al. | |

OTHER PUBLICATIONS

Erosion Pollution, "Erosion Pollution—Erosion Control and Pollution Solutions, Sports Irrigation Trailer, Portable Irrigation System for Sports Field Watering and Dust Suppression," retrieved from internet Apr. 27, 2023, https://www.erosionpollution.com/sports-field-irrigation-trailer.html, 6 pages.

Heying Company, "Wideboy WB90 Infield Groomer (Tongue Towed)," retrieved from internet Apr. 27, 2023, https://www.infield-drag.com/Infield Groomers/WideBoy WB90/wideboy wb90.htm, 2 pages.

Partac Peat Corporation, "Infield Grooming Equipment Product Catalog," Catalog # 1.03, 2020 R1, Jan. 1, 2020, 28 pages.

Pioneer Athletics, "Pro Groomer—Infield Grooming Equipment," retrieved from internet Apr. 27, 2023, https://pioneerathletics.com/pro-groomer, 2 pages.

Toro, "Sand Pro Series, Infield Groomer/Bunker Rake," Product Catalog, 2019, 8 pages.

Ventrac, "DGDR Ballpark Groomer and Renovator," Product Catalog, retrieved from internet May 16, 2023, https://www.ventrac.com/products/attachments/ballparkgroomer, 6 pages.

* cited by examiner

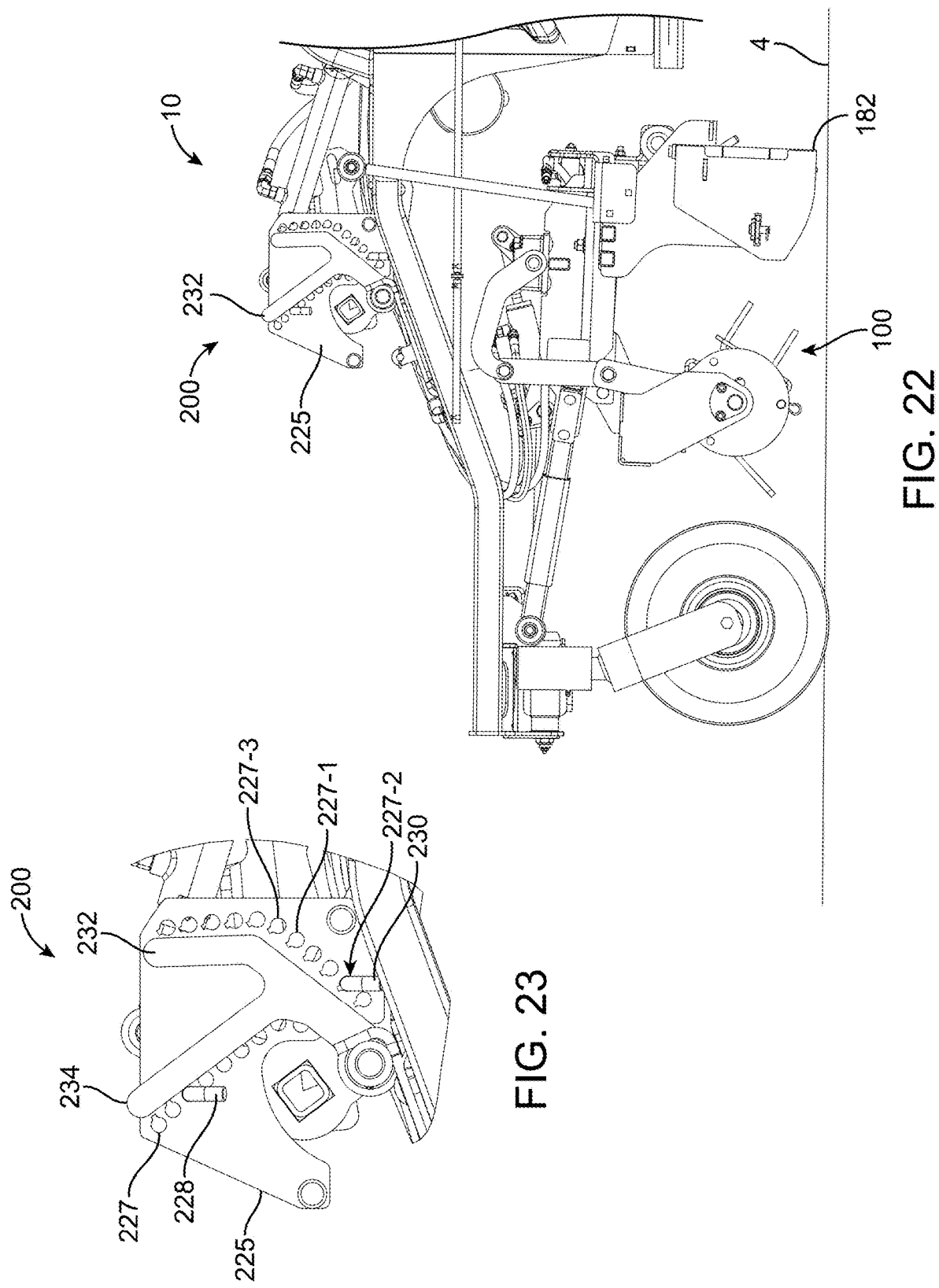

IMPLEMENT AND GROUNDS MAINTENANCE VEHICLE INCLUDING SAME

The present application claims priority to and/or the benefit of U.S. Provisional Patent Application No. 63/193,161, filed 26 May 2021, which is incorporated herein by reference in its entirety.

Embodiments of the present disclosure are directed to ground-working/grooming implements and ground maintenance vehicles configured to carry the same and, more particularly, to implements that include a multi-tool carousel.

BACKGROUND

Implements such as graders or box blades can be used in a variety of applications to manipulate or work a ground surface in a desired manner. For example, graders can be utilized to break-up a ground surface and level such surface. Such implements can be connected to a grounds maintenance vehicle. A ground-working implement can include a ground-working tool that manipulates the ground surface. For example, field groomers that are utilized to prepare a dirt playing surface on a baseball or softball field can include a ground-working tool that smooths and levels the playing surface.

SUMMARY

Embodiments described herein may provide a ground-working implement and a grounds maintenance vehicle that includes such ground-working implement. The implement can include a tool carousel that has one or more ground-working tools that are configured to manipulate a ground surface upon which the vehicle is disposed. The tool carousel is rotatable about a carousel axis such that a tool axis of a selected ground working tool forms a desired angle with the ground surface. The ground-working tool and the angle of the tool axis of such tool can be selected to manipulate the ground surface in a desired manner depending upon the condition of the ground surface. Further, the vehicle can include a pivot mechanism that is connected to a chassis of the vehicle and the implement, where the pivot mechanism is configured to raise and lower the implement relative to the ground surface. The pivot mechanism can be controlled by the operator utilizing a pivot controller. The pivot mechanism can also include an up stop and a down stop. The up stop can define a maximum distance between the ground surface and a portion of the implement that is closest to the ground surface. Further, the down stop can define a minimum distance between the ground surface and a portion of the implement closest to the ground surface or a penetration depth of the implement into the ground surface.

In one aspect, the present disclosure provides a grounds maintenance vehicle that includes a chassis having a front end, a rear end, and a longitudinal axis extending between the front end and the rear end, where the chassis is supported upon a ground surface by at least a front wheel located proximate the front end of the chassis and a rear wheel located proximate the rear end of the chassis. The vehicle also includes a ground-working implement connected to the chassis between the front and rear wheels. The implement includes an implement frame and a tool carousel rotatably connected to the implement frame. The tool carousel includes a shaft and first and second operator-selectable ground-working tools extending outwardly from the shaft, where the shaft extends along a carousel axis. The tool carousel is configured to rotate about the carousel axis and alternately lock in a first position, where the first ground-working tool is configured to contact the ground surface, and a second position, where the second ground-working tool is configured to contact the ground surface.

In another aspect, the present disclosure provides a ground-working implement that includes an implement frame and a tool carousel rotatably connected to the implement frame. The tool carousel includes a shaft and first and second operator-selectable ground-working tools extending outwardly from the shaft. The shaft extends along a carousel axis. The tool carousel is configured to rotate about the carousel axis and alternately lock in a first position, where the first ground-working tool is configured to contact a ground surface, and a second position, where the second ground-working tool is configured to contact the ground surface.

In another aspect, the present disclosure provides a grounds maintenance vehicle that includes a chassis having a front end, a rear end, and a longitudinal axis extending between the front end and the rear end. The chassis is supported upon a ground surface by at least a front wheel located proximate the front end of the chassis and a rear wheel located proximate the rear end of the chassis. The vehicle further includes a ground-working implement connected to the chassis. The implement includes an implement frame and a box blade connected to the implement frame. The box blade includes a lower edge configured to contact the ground surface. The implement further includes a pivot mechanism connected to the chassis and the implement. The pivot mechanism includes an adjustable up stop and an adjustable down stop, where the up stop defines a maximum distance between the lower edge of the box blade and the ground surface when the implement is raised relative to the ground surface and the down stop defines a minimum distance between the lower edge and the ground surface or a penetration depth of the lower edge into the ground surface when the implement is lowered relative to the ground surface.

In another aspect, the present disclosure provides a method that includes selecting a ground-working tool of a tool carousel of a ground-working implement, where the ground-working tool extends from a shaft of the tool carousel; rotating the shaft of the tool carousel such that a tool axis of the tool forms a selected angle with a ground surface; lowering the implement such that the tool contacts the ground surface; and manipulating the ground surface with the tool.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein:

FIG. 22 is a side view of the pivot mechanism of FIG. 18 with the mechanism in an up stop position.

FIG. 23 is a side view of a portion of the pivot mechanism of FIG. 18 with the mechanism in the up stop position.

Figure 1:
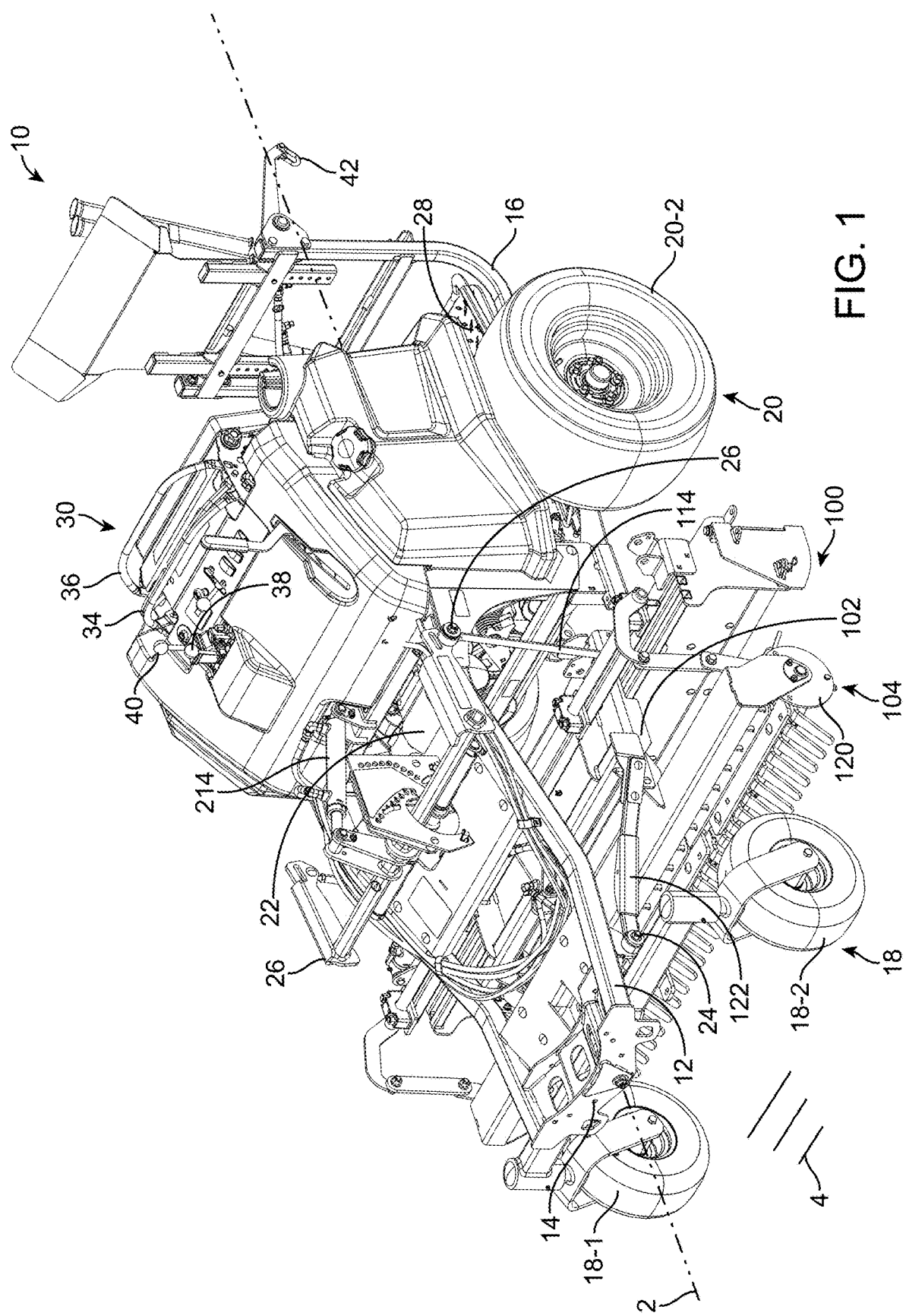
FIG. 1 is a front perspective view of one embodiment of a grounds maintenance vehicle.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION OF EXEMPLARY EMBODIMENTS

In the following detailed description of illustrative embodiments, reference is made to the accompanying figures of the drawing that form a part hereof. It is to be understood that other embodiments, which may not be described and/or illustrated herein, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about." The term "and/or" (if used) means one or all of the listed elements or a combination of any two or more of the listed elements. The term "i.e." is used as an abbreviation for the Latin phrase id est and means "that is." The term "e.g." is used as an abbreviation for the Latin phrase exempli gratia and means "for example."

Embodiments described herein may provide a ground-working implement and a grounds maintenance vehicle that includes such ground-working implement. The implement can include a tool carousel that has one or more ground-working tools that are configured to manipulate a ground surface upon which the vehicle is disposed. The tool carousel is rotatable about a carousel axis such that a tool axis of a selected ground working tool forms a desired angle with the ground surface. The ground-working tool and the angle of the tool axis of such tool can be selected to manipulate the ground surface in a desired manner depending upon the condition of the ground surface. Further, the vehicle can include a pivot mechanism that is connected to a chassis of the vehicle and the implement and is configured to raise and lower the implement relative to the ground surface. The pivot mechanism can be controlled by the operator utilizing a pivot controller. The pivot mechanism can also include an up stop and a down stop. The up stop can define a maximum distance between the ground surface and a portion of the implement that is closest to the ground surface. Further, the down stop can define a minimum distance between the ground surface and a portion of the implement closest to the ground surface or a penetration depth of the implement into the ground surface.

Grounds maintenance vehicles such as field groomers for athletic fields are designed to manipulate a ground surface such that the surface is prepared for game play. For example, some baseball and softball fields include one or more dirt or aggregate sections or portions that are adjacent to or surrounded by grass or synthetic turf sections. The dirt or aggregate portions can include at least one of dirt, clay, or synthetic materials that aid in moisture abatement. These dirt sections can become rough due to rain, wind, or activity. A roughened dirt section can make play more challenging as a ball can impact clumps or mounds of dirt, thereby changing the direction of the ball in an unpredictable manner. Further, smooth, even dirt surfaces may also be required for horse-racing tracks and rodeo arenas.

Various machinery have been designed to groom such dirt portions. For example, screens or chain link fencing sections can be pulled behind a tractor or four-wheel vehicle and are configured to smooth and level a playing surface. Further, some vehicles include an implement that can break-up clumps of dirt and smooth the playing surface. Such implements, however, typically carry one or two tools that have limited capabilities. Further, to select a tool based upon the conditions of the playing surface, the implement may need to be removed from the vehicle so that the selected tool can be connected to the vehicle. Such changing out of implements can be time consuming and laborious.

One or more embodiments of an implement and a grounds maintenance vehicle that includes such an implement as described herein can provide various advantages over currently available equipment. For example, the implement can include a tool carousel that has two or more ground-working tools that can be selected by an operator based upon the conditions of the playing surface without having to replace the entire implement. Further, each tool of the tool carousel can be oriented in relation to a ground surface to provide various functionalities. For example, a tool axis of a ground-working tool of the tool carousel can be rotated about a sweep angle such that the tool axis forms a desired angle with a ground surface. In one or more embodiments, the tool axis can be oriented in a forward direction such that a tip of the tool penetrates the ground surface or lift portions of such ground surface. Further, in one or more embodiments, the tool axis can be oriented in a rearward direction such that the tool drags the ground surface. The implement can also include a box blade that is disposed in any suitable relationship to the tool carousel. The box blade can be utilized to further manipulate the ground surface. For example, a lower edge of the box blade can be utilized to smooth the ground surface while a box of the box blade can collect portions of the ground surface and redistribute such portions in desired sections of the ground surface.

Figure 2:
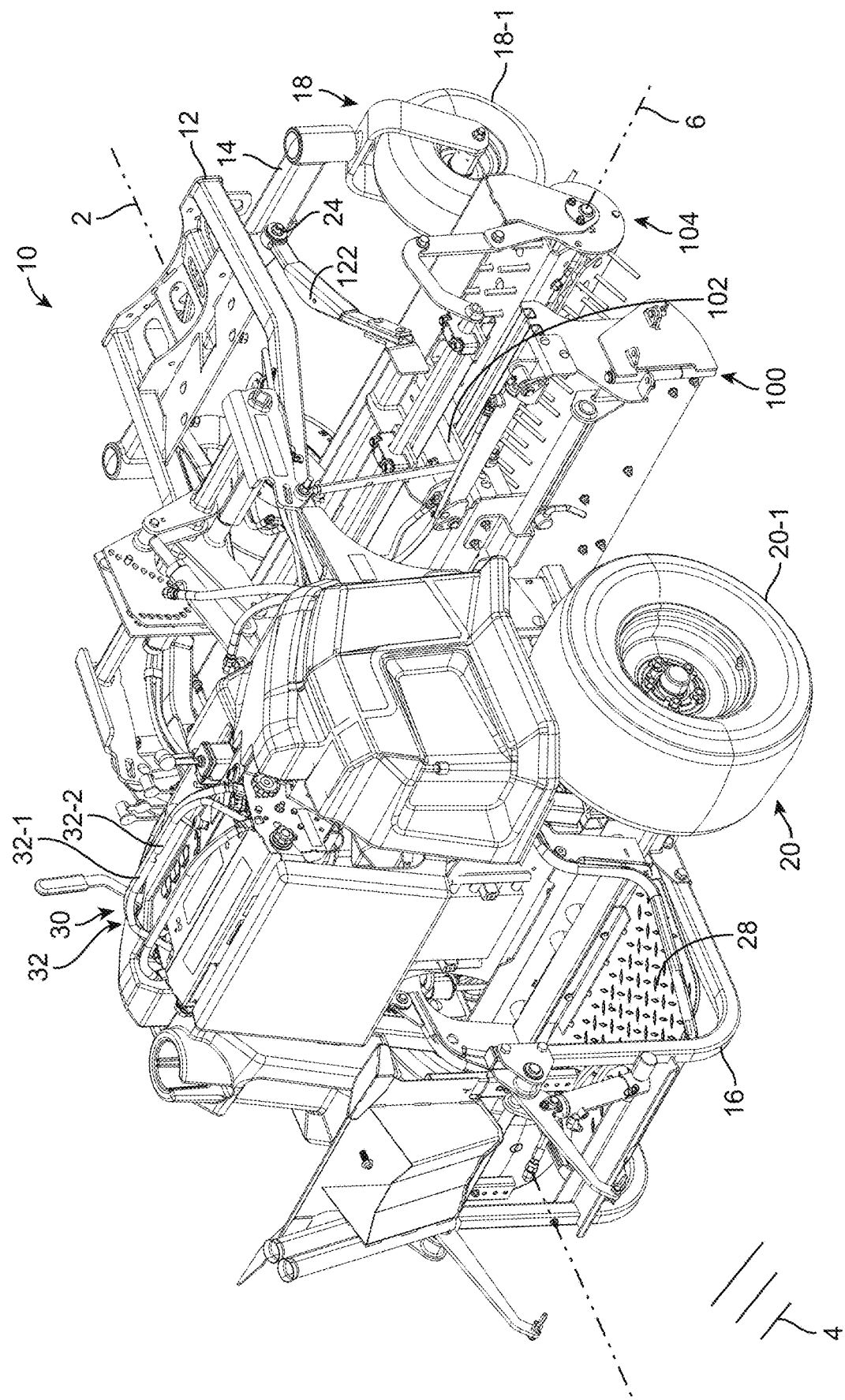
FIG. 2 is a rear perspective view of the grounds maintenance vehicle of FIG. 1.
Figure 3:
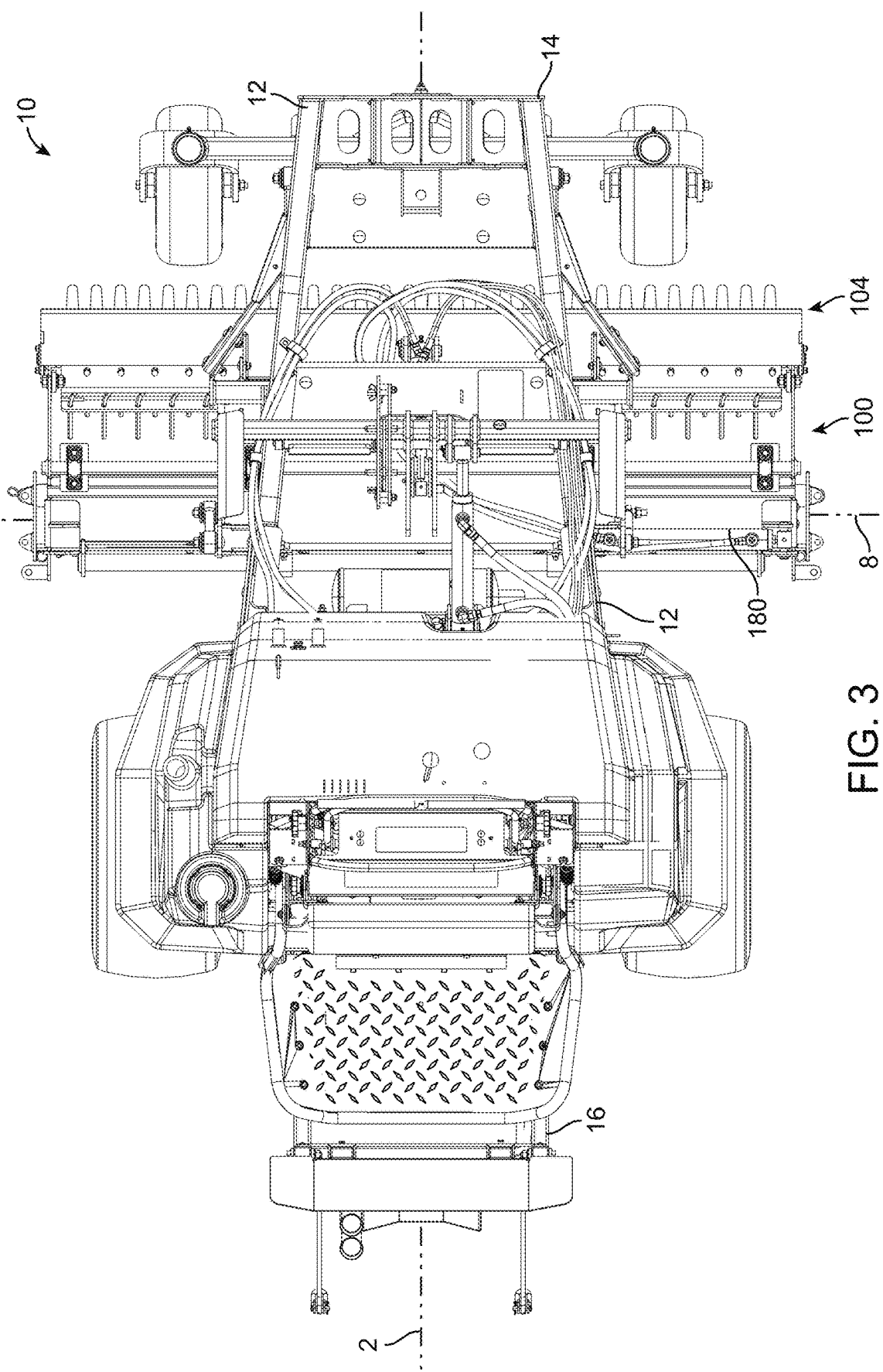
FIG. 3 is a top plan view of the grounds maintenance vehicle of FIG. 1.
Figure 4:
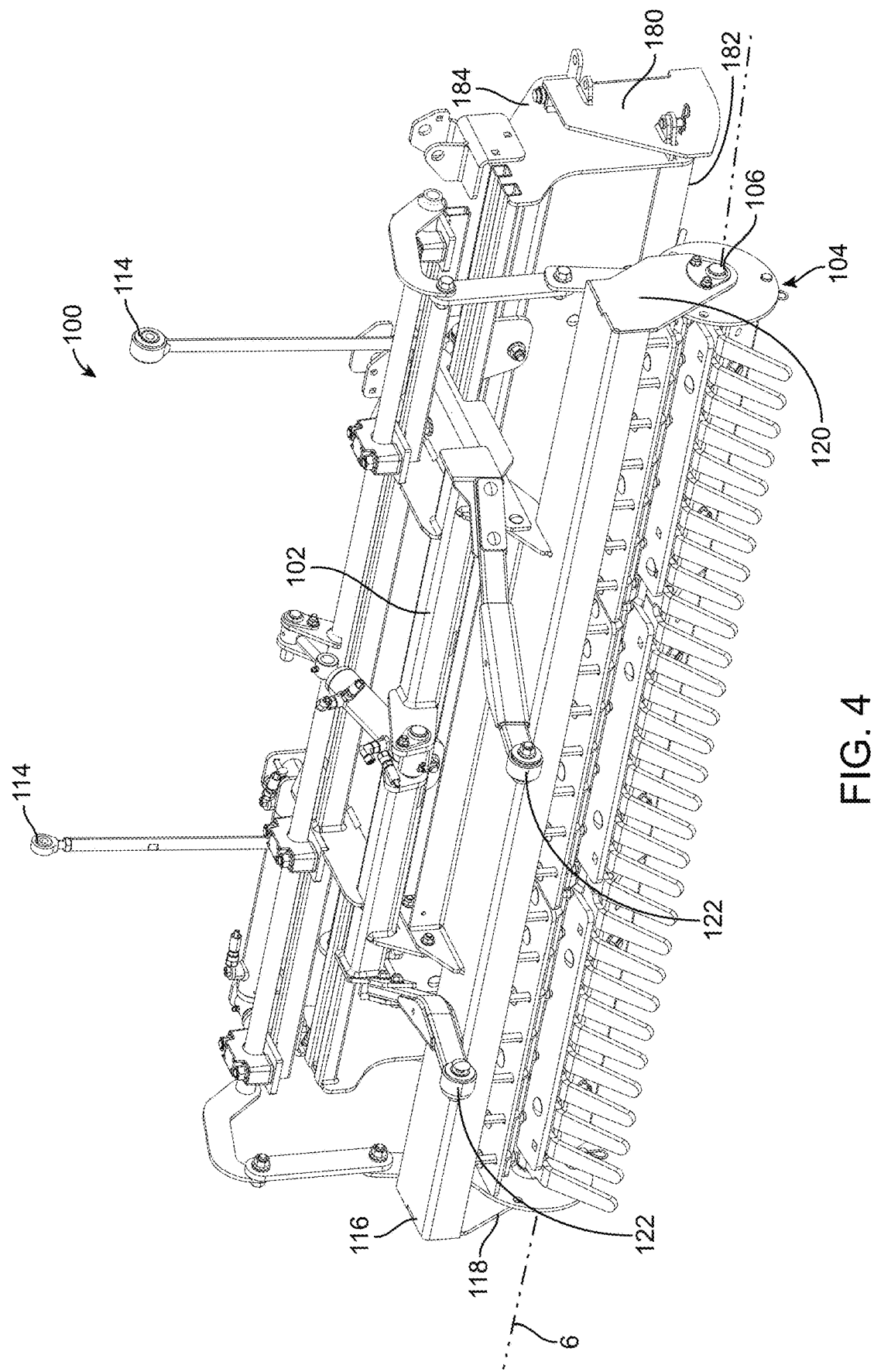
FIG. 4 is a front perspective view of a ground-working implement of the grounds maintenance vehicle of FIG. 1.
Figure 5:
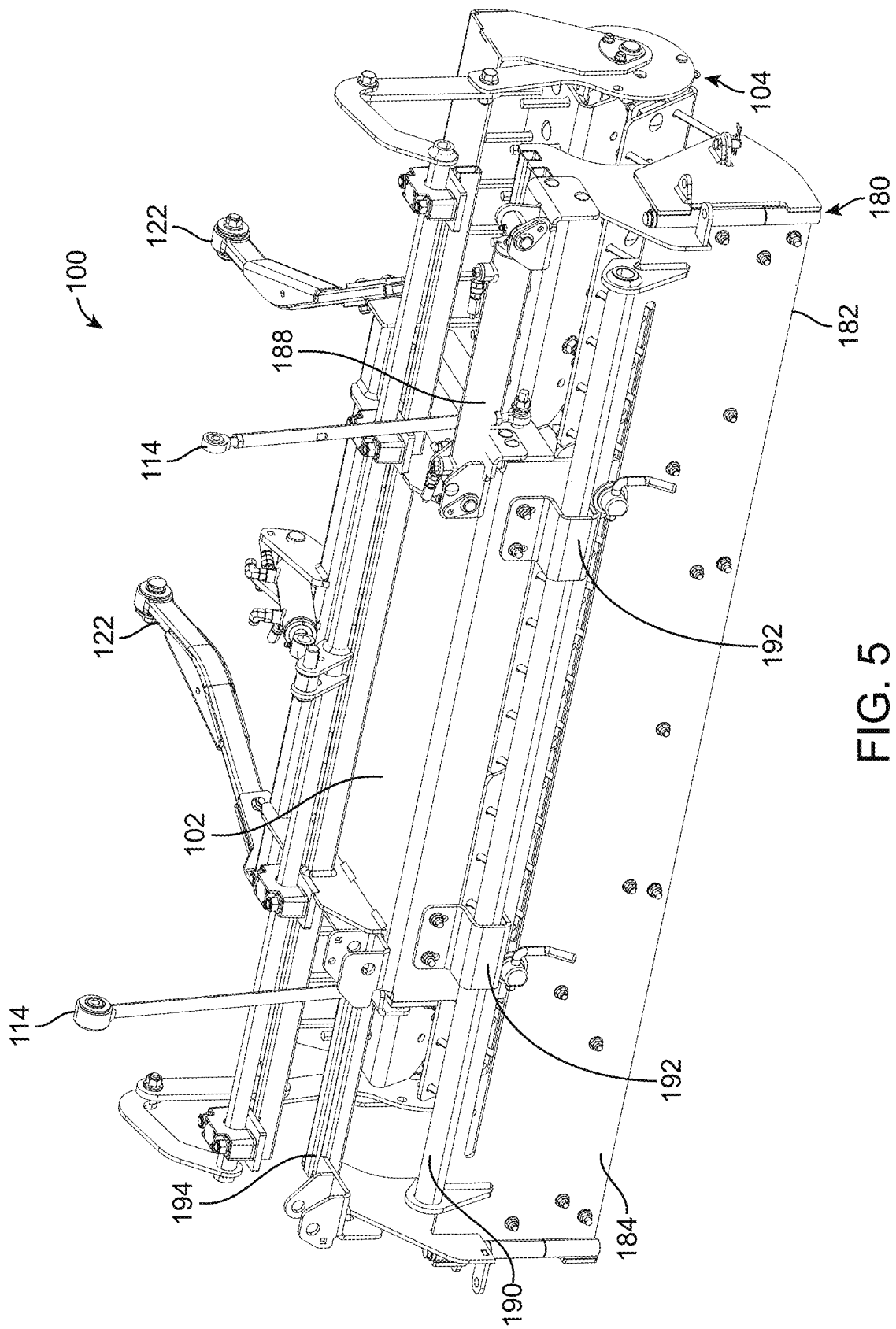
FIG. 5 is a rear perspective view of the implement of FIG. 4.
Figure 6:
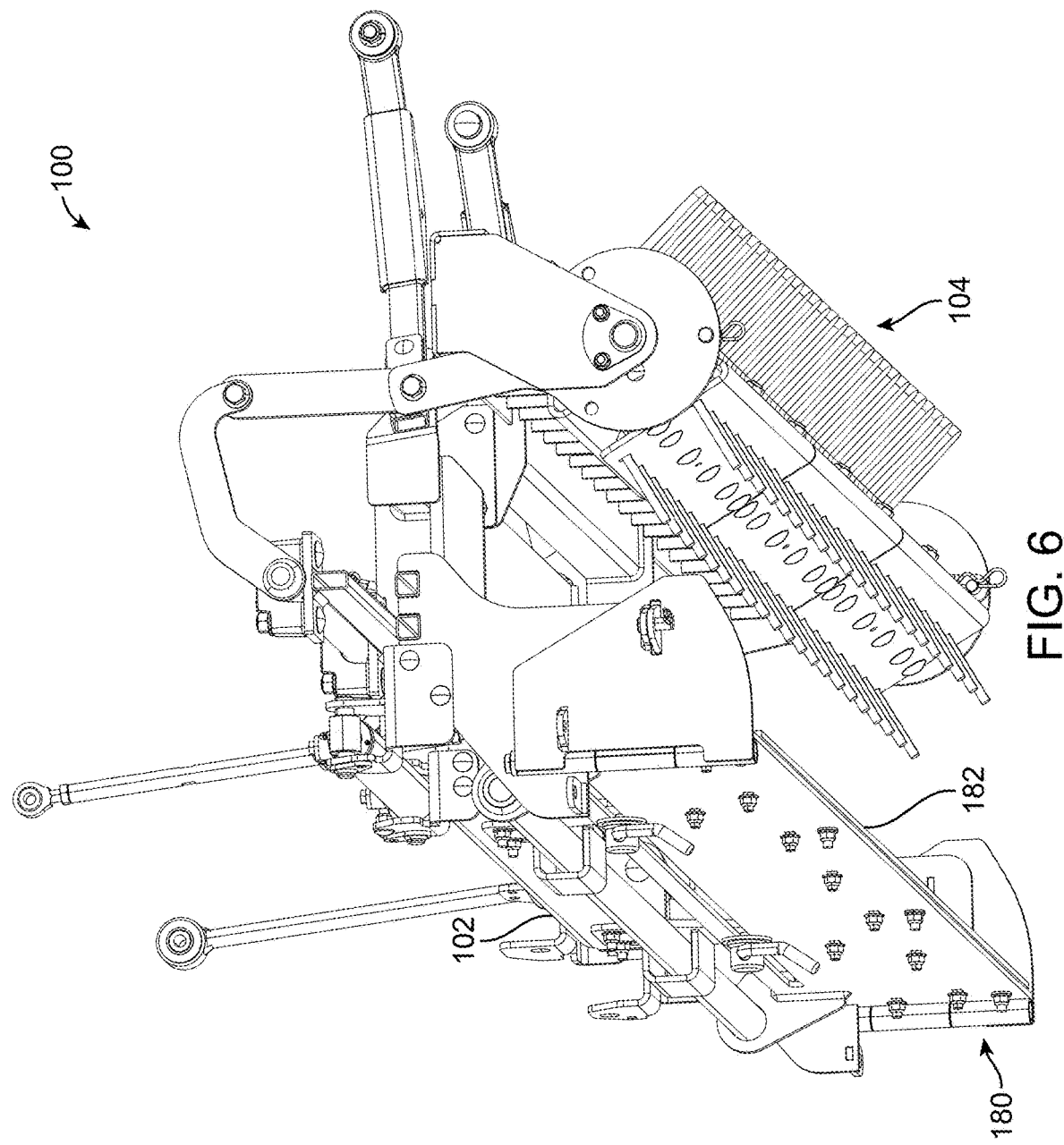
FIG. 6 is a bottom perspective view of the implement of FIG. 4.

With reference to the figures of the drawing, wherein like reference numerals designate like parts and assemblies throughout the several views, FIGS. 1-3 are various views of one embodiment of a grounds maintenance vehicle 10. The vehicle 10 includes a chassis 12 having a front end 14, a rear end 16, and a longitudinal axis 2 extending between the front end and the rear end. The chassis 12 is supported upon a ground surface 4 by at least a front wheel 18-1 or 18-2 (collectively front wheels 18) located proximate the front end 14 of the chassis and a rear wheel 20-1 or 20-2 (collectively rear wheels 20) located proximate the rear end 16 of the chassis. As used herein, the ground surface 4 is a theoretical ground plane defined by a plane that contacts at least three wheels 18, 20 of the vehicle 10. The vehicle 10 further includes a ground-working implement 100 connected to the chassis 12 between the front and rear wheels 18, 20. FIGS. 4-8 are various views of the implement 100. The implement 100 includes an implement frame 102 and a tool carousel 104 rotatably connected to the implement frame. The tool carousel 104 includes a shaft 106 (FIG. 4), a first operator-selectable ground-working tool 108 (FIG. 8), and a second operator-selectable ground-working tool 110. Each of the first and second ground-working tools 108, 110 extends outwardly from the shaft 106. The shaft 106 extends along a carousel axis 6. Further, the tool carousel 104 is configured to rotate about the carousel axis 6 and alternately lock in a first position (FIG. 10), where the first ground-working tool 108 is configured to contact the ground surface 4, and a second position (FIG. 11), where the second ground-working tool 110 is configured to contact the ground surface.

It is noted that the terms "have," "include," "comprise," and variations thereof, do not have a limiting meaning, and are used in their open-ended sense to generally mean "including, but not limited to," where the terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective shown in the particular figure, or while the vehicle 10 is in an operating configuration (e.g., while the vehicle is positioned such that wheels 18, 20 rest upon the ground surface 4 as shown in FIGS. 1-2). These terms are used only to simplify the description, however, and not to limit the interpretation of any embodiment described.

The vehicle 10 can include any suitable motorized vehicle that can support and carry the ground-working implement 100 such that the implement can treat or manipulate the ground surface 4. Suitable vehicles 10 include most any walk-behind, ride-behind, or ride-on utility vehicle (including dedicated and general-purpose vehicles) skid-steer loaders, utility loaders, agricultural tractors/vehicles, field groomers, etc.

The chassis 12 of the vehicle 10 can include any suitable frame or structure that is configured to carry the implement 100 and a prime mover, e.g., internal combustion engine 22 (FIG. 1) or, alternatively, electric motor(s). A pair of transversely opposing, ground engaging drive members (e.g., at least one of front wheels 18 or rear wheels 20) may be coupled for rotation, respectively, to the left and right sides of the chassis 12 to support and propel the vehicle 10 relative to the ground surface 4. A transmission attached to the chassis 12 may be configured to power one or both of the first and second drive members. In one or more embodiments, each of the drive members can be powered by its own transmission attached to the chassis, e.g., by its own hydrostatic motor and pump or by an integrated hydrostatic transaxle. Each transaxle may be attached to the chassis 12 and be powered by the engine 22 using any suitable technique or techniques. While not illustrated, other transmissions, e.g., mechanical gear- or pulley-driven systems, are also possible. Moreover, in the case of electric vehicles, the transmissions can be configured as one or more electric motors (e.g., one motor driving the first drive member and a second motor driving the second drive member).

The chassis 12 is supported upon the ground surface 4 by at least the front wheels 18 located proximate the front end 14 of the chassis and the rear wheels 20 located proximate the rear end 16 of the chassis. As used herein, the term "proximate the front end" means that an element or component of the vehicle 10 is disposed closer to the front end 14 of the chassis 12 than to the rear end 16. Further, the term "proximate the rear end" means that an element or component of the vehicle 10 is disposed closer to the rear end 16 of the chassis 12 than to the front end 14. Although the vehicle 10 is shown as including two front wheels 18 and two rear wheels 20, such vehicle can include any suitable number of wheels, e.g., a tri-wheel configuration with two front wheels 18 and a single rear wheel 20 or a single front wheel with two rear wheels. Further, the vehicle 10 can include one or more tracks or rollers in place of one or more of the front and rear wheels 18, 20. One or more of the front wheels 18 can be connected to the engine 22 to provide one or more drive wheels. In one or more embodiments, one or more rear wheels 20 can be connected to the engine 22 to provide one or more drive wheels. In general, any multi-wheel, -track, or other multi-output configuration is contemplated.

As illustrated in FIGS. 1-2, the vehicle 10 may further include an operator control system 30. The control system 30 may include operator controls that are mounted to upwardly extending portions of the chassis 12 near the rear end 16 of the vehicle 10 such that the controls are located within comfortable reach of an operator standing either behind the vehicle or upon platform 28. The control system 30 can include any suitable control system or controls, e.g., one or more embodiments of a control system described in co-filed U.S. Patent Provisional Application No. 63/193,176 and entitled DRIVE CONTROL SYSTEM FOR RIDE-ON OR WALK-BEHIND VEHICLE.

The control system 30 may include, among other elements, a first input (e.g., first operator-controlled lever 32-1 of FIG. 2) and a second input (e.g., second operator-controlled lever 32-2) (collectively "operator-controlled levers 32). The operator-controlled levers 32 may be referred to herein merely as "control levers" or "steering levers." The control levers 32 may be configured to pivot about a transverse, horizontal axis between a first or forward stop 34, and a second or rearward stop 36 (levers 32 are shown against the forward stop 34 in each of FIGS. 1-2). While illustrated as being fixed relative to the chassis 12, one or both stops 34, 36 could alternatively be adjustable (e.g., pivotable). In yet other embodiments, the stops 34, 36 may be entirely optional (i.e., they may be absent altogether from the vehicle). While not illustrated, one or both of the control levers 32 may also incorporate an operator presence switch (not shown). As is recognized in the art, activation of the presence switch may be required before engaging some of the vehicle subsystems.

The operator control system 30 can include any other suitable controllers. For example, as shown in FIG. 1, the control system 30 further includes a tool carousel controller 38 and a pivot controller 40. The tool carousel controller 38 can be connected to a carousel actuator 170 (FIG. 7) (as is further described herein) that is connected to the tool carousel 104. In addition, the pivot controller 40 can be connected to a pivot actuator 214 of pivot mechanism 200 (FIG. 18) as is further described herein. The controllers 38, 40 can be connected to their respective actuators 170, 214 using any suitable technique or techniques. In one or more embodiments, the actuators 170, 214 are hydraulic actuators, and the controllers 38, 40 are connected to the actuators by one or more hydraulic lines. In one or more embodiments, the controllers 38, 40 can be electrically connected to the respective actuators 170, 214.

Connected to the chassis 12 is the ground-working implement 100. Such implement 100 can be connected to the chassis 12 in any suitable location. In one or more embodiments, the implement 100 can be connected to the chassis 12 between the front and rear wheels 18, 20 as shown in FIG. 1. In one or more embodiments, the implement 100 can be connected to rear implement connector 42. Further, the implement 100 can be connected to the chassis 12 using any suitable technique or techniques. In one or more embodiments, the implement 100 is connected to the chassis 12 by one or more arms 122 (FIG. 4) that extend from the frame 102 of the implement. Each arm 122 is connected to a pivot point 24 (FIG. 1) disposed on the chassis 12. The implement 100 is further connected to the chassis by links 114 that are each connected to the frame 102 at a pivot point 26. The links 114 are connected to the pivot mechanism 200 that is configured to raise and lower the implement as is further described herein. Although depicted as including a single implement 100, the vehicle 10 can include two or more implements connected to the chassis 12 in any suitable location. For example, the implement 100 can be connected to the chassis 12 between the front and rear wheels 18, 20, and a second implement (not shown) can be connected to the chassis at the rear implement connector 42. The vehicle 10 can include any suitable additional implements, e.g., a drag screen connected to the rear implement connector 42 that is configured to smooth the ground surface 4.

As shown in greater detail in FIGS. 4-14, the implement 100 includes the frame 102 and the tool carousel 104 that is rotatably connected to the implement frame using any suitable technique or techniques. In the embodiment illustrated in FIGS. 4-14, the tool carousel 104 is connected to the implement frame 102 by a carousel frame 116 that extends between a first end 118 and a second end 120 of the carousel frame. The shaft 106 of the carousel 104 is rotatably connected to the first and second ends 118, 120 of the carousel frame 116 using any suitable technique or techniques.

Figure 8:
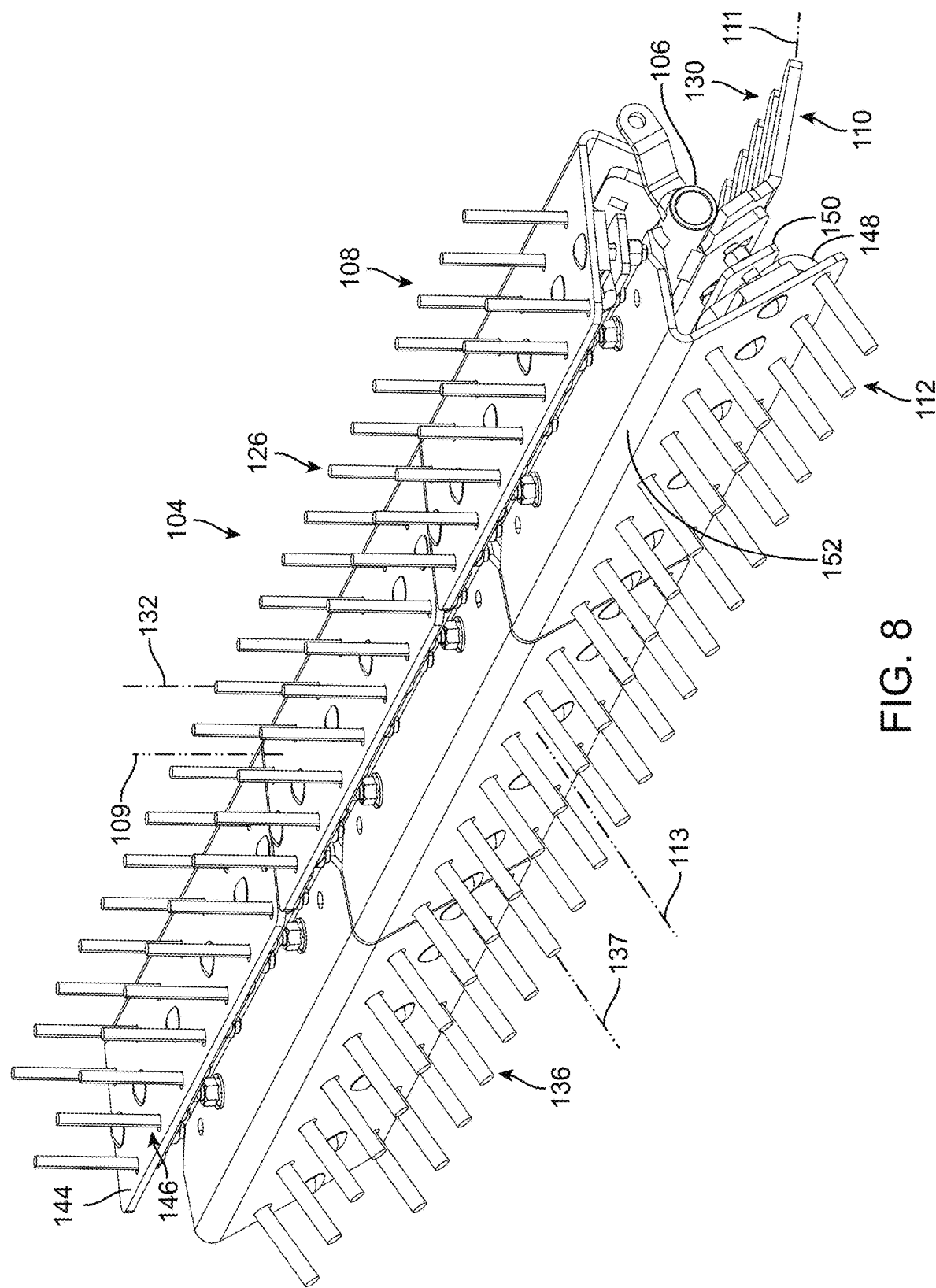
FIG. 8 is a perspective view of a tool carousel of the implement of FIG. 4.
Figure 10:
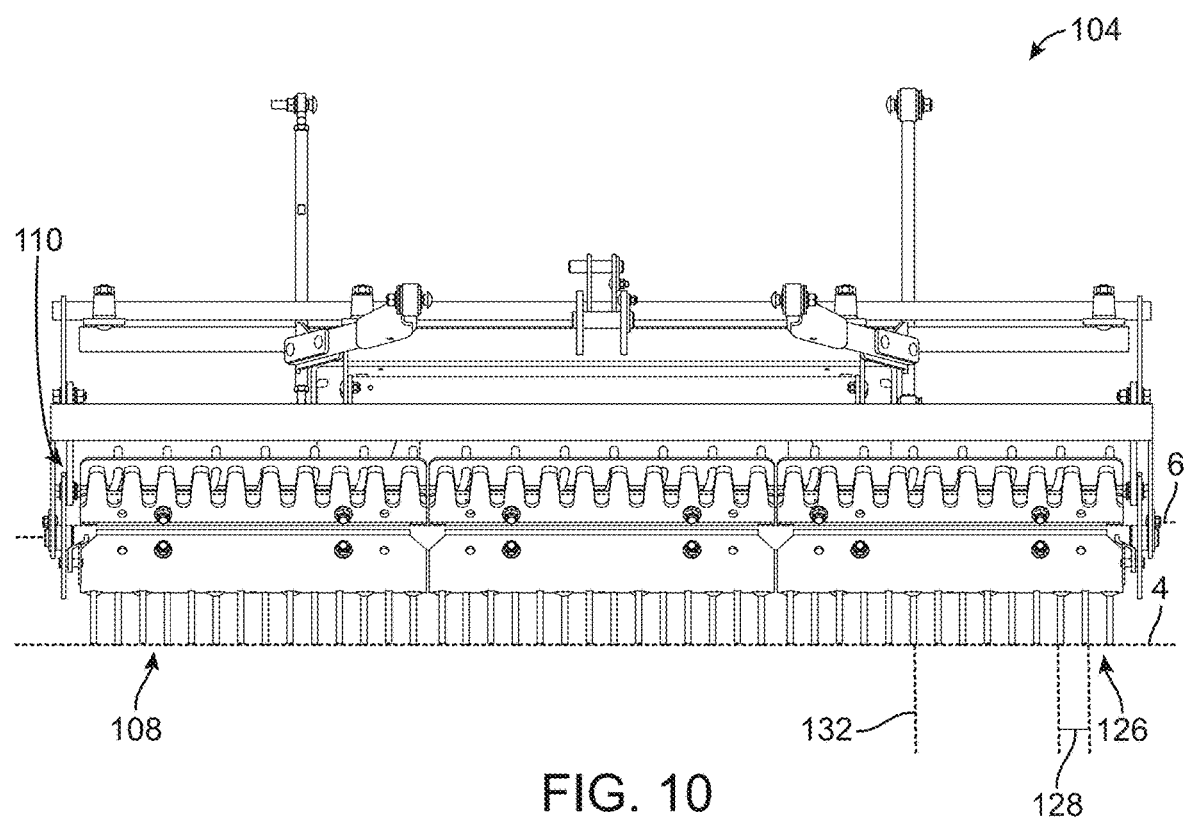
FIG. 10 is a front view of the implement of FIG. 4 with a first operator-selectable ground-working tool of the tool carousel in contact with a ground surface.

The tool carousel 104 can take any suitable shape or shapes and have any suitable dimensions. Further, the tool carousel 104 can include any suitable number of operator-selectable ground-working tools. For example, as shown in FIG. 8, the tool carousel 104 includes the first ground-working tool 108 and the second ground-working tool 110. The tool carousel 104 can also include a third operator-selectable ground-working tool 112. Each of the first, second, and third ground-working tools 108, 110, 112 extends outwardly from the shaft 106 along a tool axis 109, 111, and 113, respectively. In one or more embodiments, each tool axis 109, 111, and 113 can be defined by a tine axis of a tine (e.g., tine axis 132 of tines 126 as shown in FIG. 10) of the ground-working tool. Each of the ground working tools 108, 110, 112 can include any suitable tools. In one or more embodiments, at least one of the ground-workings tools 108, 110, 112 includes a plurality of tines. The tool carousel 104 can include any suitable ground-working tools, e.g., brushes, discs, mini-disc cultivators, magnets, slit seeders, rollers, aerators, sprayers, earth working tools, etc. In one or more embodiments, the tool carousel 104 can include one or more ground-working tools such as Bullseye™ natural or synthetic turf maintenance implements available from The Toro Company (Bloomington, MN).

In one or more embodiments, the first ground-working tool 108 includes a plurality of tines 126. Each tine of the plurality of tines 126 can extend radially from the shaft 106 along the tine axis 132. Further, each tine of the plurality of tines 126 can take any suitable shape and have any suitable dimensions. In one or more embodiments, each tine of the plurality of tines 126 can take the same shape and have the same dimensions. In one or more embodiments, one or more tines can have at least one of a shape or dimension that is different from one or more additional tines of the plurality of tines 126. One or more of the plurality of tines 126 can extend along the tine axis 132 (FIGS. 8 and 10). In one or more embodiments, the tine axis 132 can be substantially parallel to the tool axis 109 of the first ground-working tool 108 (FIG. 8). Similarly, the second ground-working tool 110 includes a second plurality of tines 130, and the third ground-working tool 112 includes a third plurality of tines 136. Each tine of the second plurality of tines 130 can extend radially from the shaft 106 along a second tine axis 134, and each tine of the third plurality of tines 136 can extend radially from the shaft along a third tine axis 137.

Figure 11:
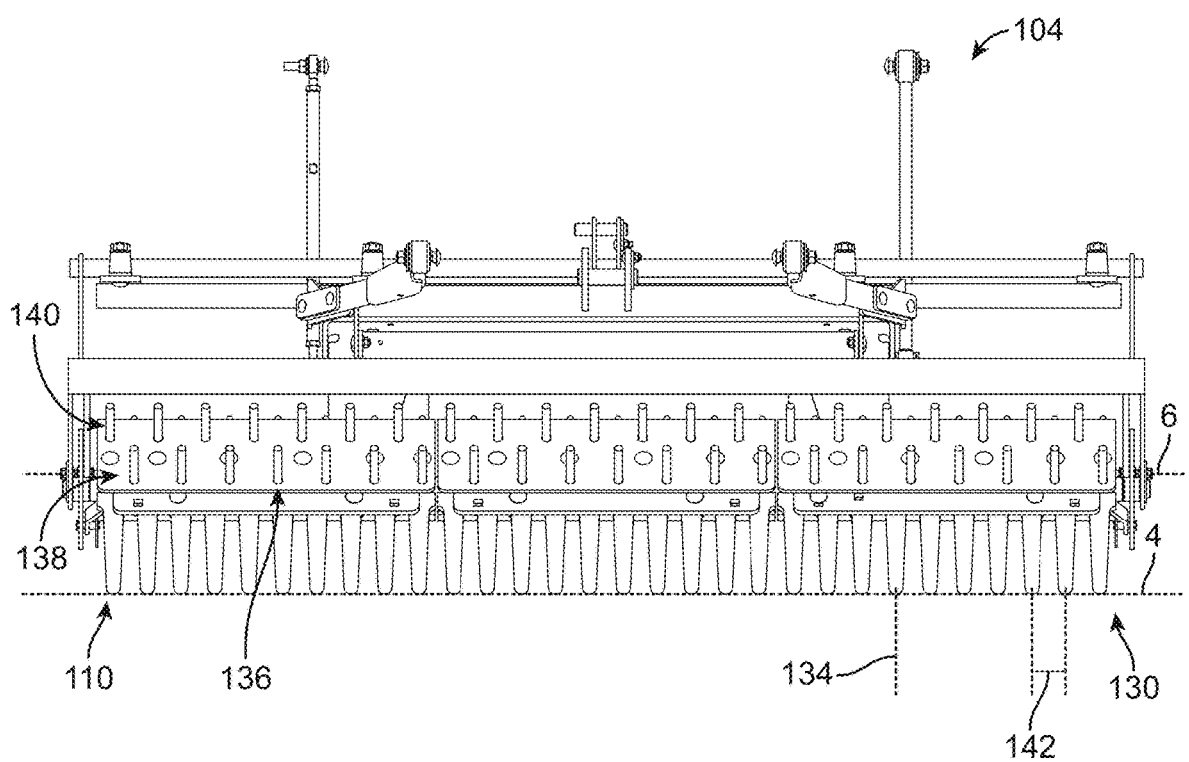
FIG. 11 is a front view of the implement of FIG. 4 with a second operator-selectable ground-working tool of the tool carousel in contact with the ground surface.

The plurality of tines 126 of the first ground-working tool 108 can be arranged in any suitable relationship. In one or more embodiments, the tines 126 can be arranged along a line that is parallel to the carousel axis 6. In one or more embodiments, the tines 126 can be arranged in two or more or rows. For example, the plurality of tines 136 of the third ground-working tool 112 are arranged in a first row 138 and a second row 140 as shown in FIG. 11. The tines in each row 138, 140 can be aligned in a direction orthogonal to the rows. In one or more embodiments, one or more of the tines in the first row 138 can be offset from one or more tines in the second row 140 as viewed in a direction orthogonal to the rows. Further, the plurality of tines 126 can have any suitable center-to-center spacing 128 between adjacent tines as shown in FIG. 10.

Each of the tools 108, 110, 112 can have any suitable center-to-center spacing. For example, as shown in FIG. 11, tines 130 of the second ground-working tool 110, one or more of which extending along a tine axis 134, can have a center-to-center spacing 142 (FIG. 11) between at least two adjacent tines that is greater than, equal to, or less than the center-to-center spacing 128 of at least two adjacent tines 126 of the first ground-working tool 108. By having tools 108, 110, 112 of varying dimensions (e.g., center-to-center spacing of tines, shapes of tines, etc.), the tool carousel 104 can manipulate the ground surface in a variety of ways to address various conditions of the ground surface 4 as is further described herein.

Figure 9:
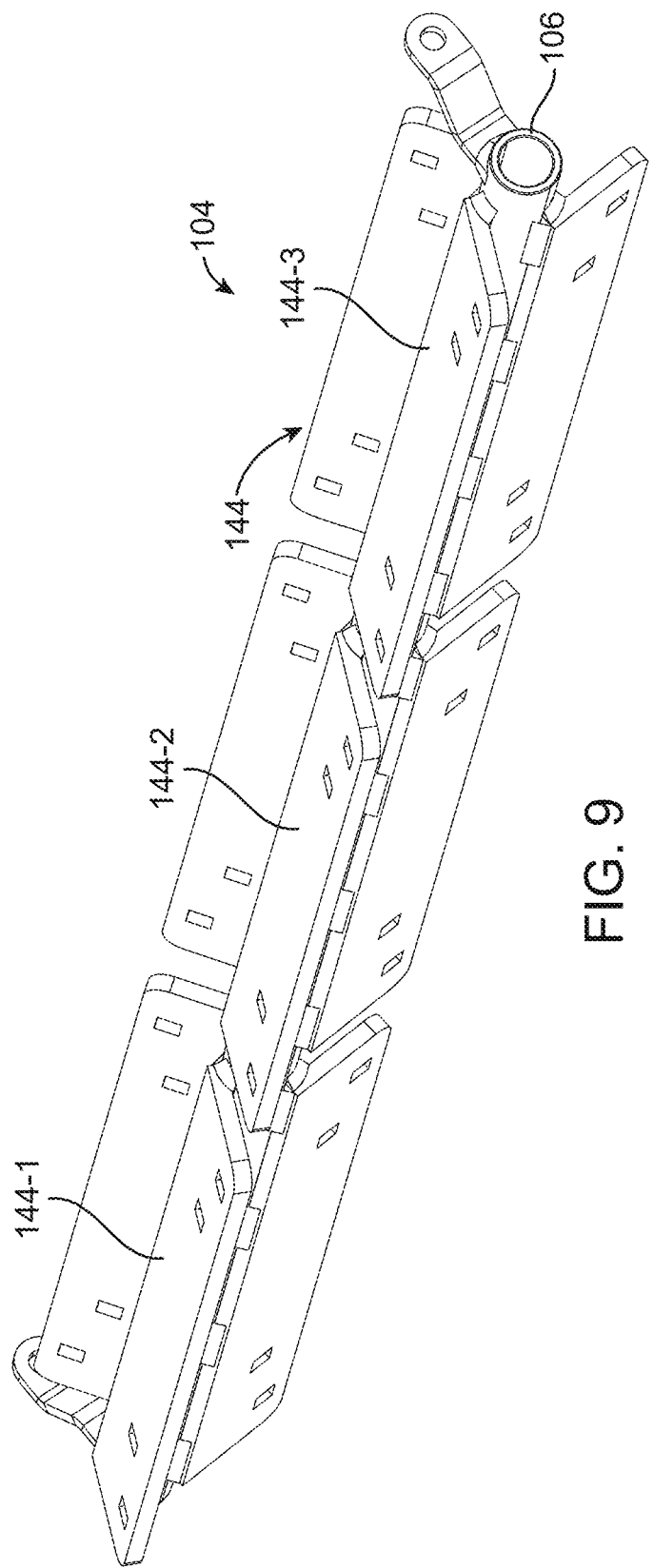
FIG. 9 is a perspective view of a shaft of the tool carousel of FIG. 8.

The ground-working tools 108, 110, 112 can be connected to the shaft 106 using any suitable technique or techniques. As shown in FIG. 8, the first ground-working tool 108 includes a plate 144 that can be connected to the shaft 106 using any suitable technique or techniques, e.g., the plate can be welded to the shaft. Similarly, the second and third ground-working tools 110, 112 can each include plates that are connected to the shaft 106. The plate 144 can be a continuous plate that extends along the length of the first ground-working tool 108. In one or more embodiments, the plate 144 can include two or more sections that are each connected to the shaft 106 as shown in FIG. 9, where the plate includes a first plate section 144-1, a second plate section 144-2, and third plate section 144-3. Further, each of the tines 126 of the first ground-working tool 108 can be connected to the plate 144 using any suitable technique or techniques. As shown in FIG. 8, each of the plurality of tines 126 can extend through openings 146 that are disposed through the plate 144. The plurality of tines 126 can be fastened to the plate 144 using any suitable technique or techniques. For example, two tines of the plurality of tines 136 of the third ground-working tool 112 can be connected to form a U-shaped tine assembly 148 that is then held in place through plate 152 by a bracket 150.

As mentioned herein, the tool carousel 104 is configured to rotate the ground working tools 108, 110, 112 about the carousel axis 6. In one or more embodiments, the tool carousel 104 is configured to be translated along the carousel axis 6 using any suitable technique or techniques, e.g., one or more of the techniques described herein regarding translation of a box blade 180 along lateral axis 8.

Figure 12:
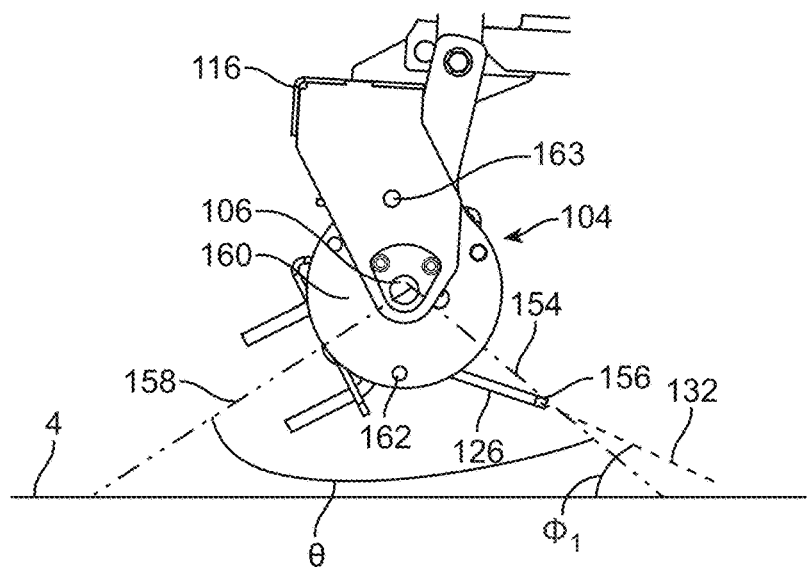
FIG. 12 is a side view of a portion of the implement of FIG. 4 with the first operator-selectable ground-working tool of the tool carousel locked in a first orientation in which a tine axis of a tine of a plurality of tines of the first ground-working tool extends in a rear direction and forms a first angle with the ground surface.
Figure 13:
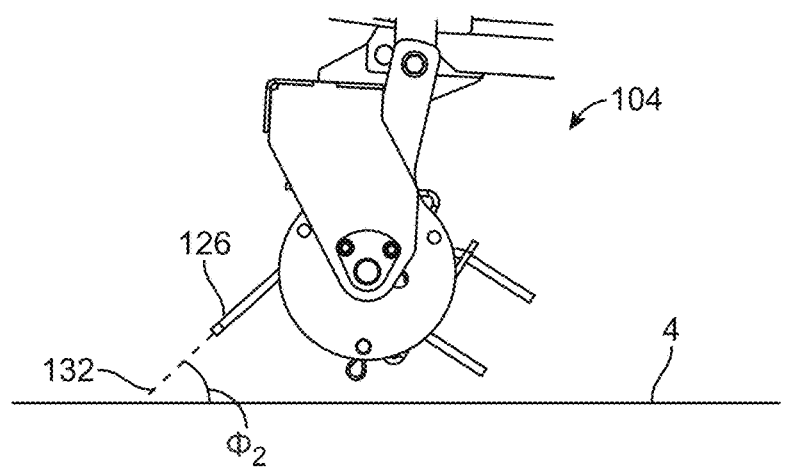
FIG. 13 is a side view of the portion of the implement of FIG. 12 with the first operator-selectable ground-working tool of the tool carousel locked in a second orientation in which the tine axis of the tine of the plurality of tines of the first ground-working tool extends in a forward direction and forms a second angle with the ground surface.
Figure 14:
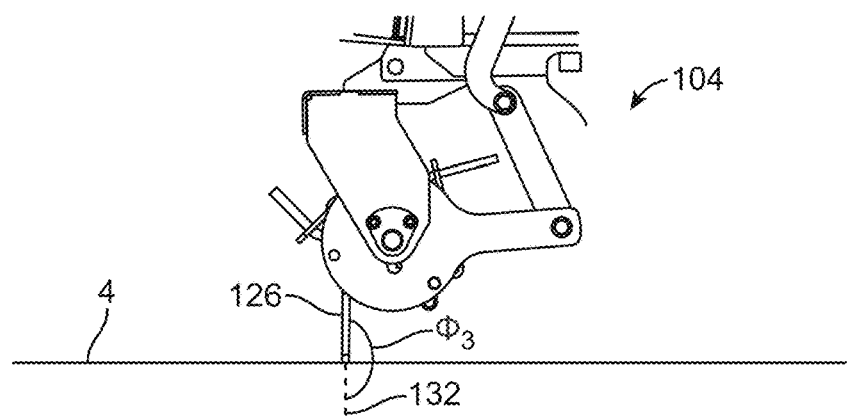
FIG. 14 is a side view of the portion of the implement of FIG. 12 with the first operator-selectable ground-working tool of the tool carousel locked in a third orientation in which the tine axis of the tine of the plurality of tines of the first ground-working tool is substantially orthogonal to the ground surface.

The tool carousel 104 can be configured to rotate the ground working tools 108, 110, 112 about the carousel axis 6 through a sweep angle θ as shown in FIGS. 12-14. As used herein, the term "sweep angle" refers to an angle formed by a first radial line 154 that extends from a center of the shaft 106 and intersects a tip of a ground working tool, e.g., tip 156 of tine 126 of the first ground-working tool 108 as shown in FIG. 12, when the tip of the tine is in its reward-most position (i.e., a tine axis 132 of the tine 126 is directed toward the rear end 16 of the vehicle), and a second radial line 158 that extends from the center of the shaft to the tip of the ground-working tool when the ground working tool is positioned at its forward most position in relation to the front end 14 of the vehicle. The sweep angle θ can have any suitable value. In one or more embodiments, the sweep angle θ can be greater than 0 degrees and no greater than 120 degrees.

Any suitable technique or techniques can be utilized to select a ground-working tool for manipulating the ground surface 4. In one or more embodiments, selection of the ground-working tool can be done manually. For example, as shown in FIG. 12, the carousel 104 includes an end plate 160 having a plurality of openings 162 disposed therethrough. An operator can remove a pin or bolt from an opening 162 and opening 163 in carousel frame 116 and manually rotate the tool carousel 104 until the desired ground working tool is selected. Once selected, the ground-working tool can be locked into place by reinserting the pin or bolt through the opening 162 in end plate 160 and opening 163 of the frame 116. The tool carousel 104 is, therefore, configured to rotate about the carousel axis 6 and alternately lock in a first position, where the first ground-working tool 108 is configured to contact the ground surface 4, and a second position, where the second ground-working tool 110 is configured to contact the ground surface 4. In one or more embodiments, the tool carousel 104 is configured to rotate about the carousel axis 6 and lock in a third position, where the third ground-working tool 112 is configured to contact the ground surface 4. In one or more embodiments, the ground-working tool can be selected using any suitable control system such that the operator can select such tool while disposed on the platform of the vehicle 10, e.g., electrical, hydraulic, linear, or rotational control systems.

The tool carousel 104 can be configured to lock-in a ground working tool in a selected orientation. For example, the tool carousel 104 can be configured to lock the first ground working tool 108 in a first orientation (FIG. 12) and a second orientation (FIG. 13). When in the first orientation, the tine axis 132 of at least one tine of the plurality of tines 126 of the first ground-working tool 108 extends in a rear direction towards the rear end 16 of the vehicle 10 and forms a first angle $\phi_1$ with the ground surface 4. The first angle $\phi_1$ can be any suitable angle, e.g., greater than 10 degrees and no greater than 85 degrees. Further, when in the second orientation as shown in FIG. 13, the tine axis 132 of the at least one tine of the plurality of tines 126 of the first ground-working tool 108 extends in a forward direction towards the front end 14 of the vehicle 10 and forms a second angle $\phi_2$ with the ground surface 4. The second angle $\phi_2$ can be any suitable angle, e.g., greater than 10 degrees and less than 85 degrees. Further, in one or more embodiments, the first ground-working tool 108 can be disposed in a third orientation as shown in FIG. 14. In this orientation, the tine axis 132 of the at least one tine of the plurality of tines 126 of the first ground-working tool 108 extends in a substantially orthogonal direction to the ground surface 4, e.g., a third angle $\phi_3$ formed between the tine axis and the ground surface is about 90 degrees.

Figure 7:
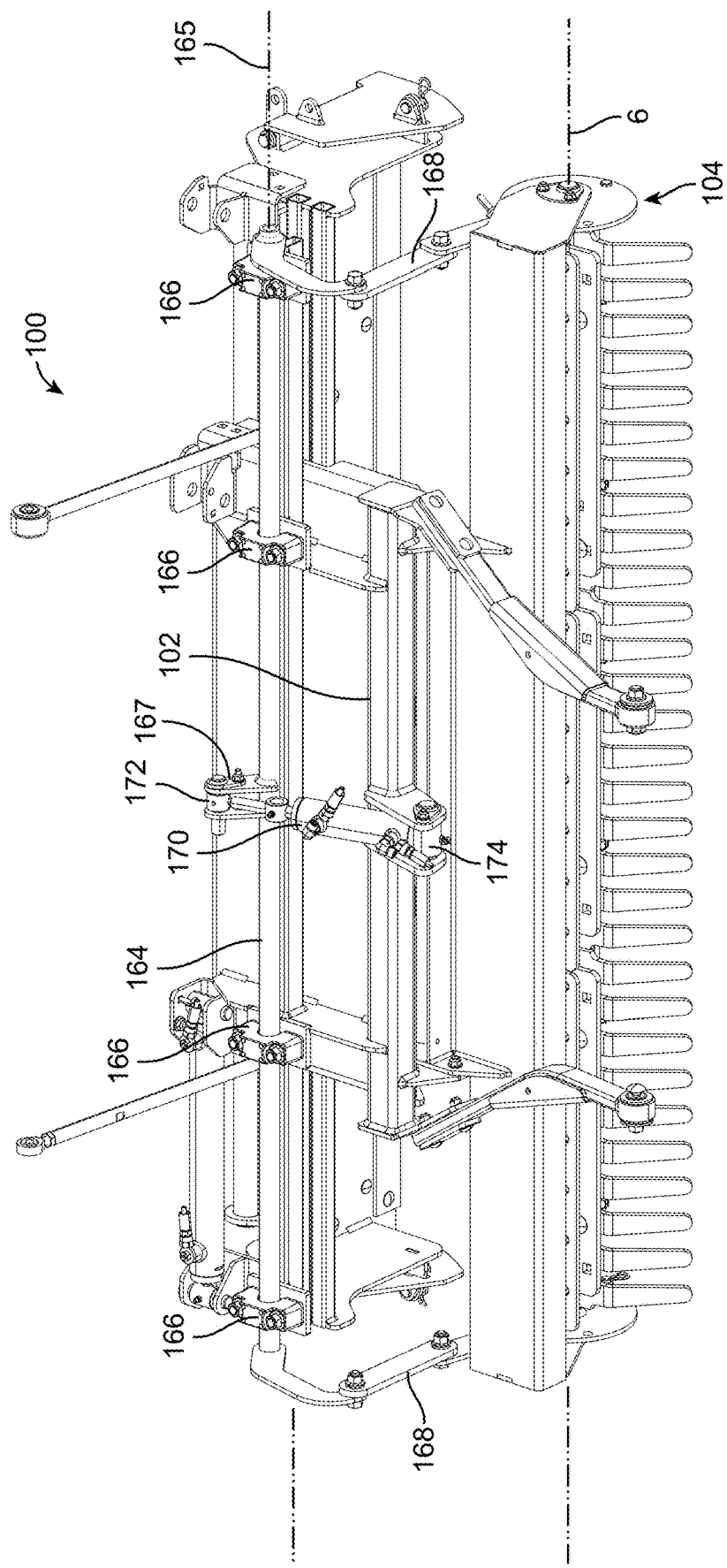
FIG. 7 is a front elevated perspective view of the implement of FIG. 4.

The tool carousel 104 can lock in each of the ground working tools 108, 110, 112 in one or more positions using any suitable technique or techniques. For example, as shown in FIG. 7, a rotatable shaft 164 of the ground-working implement 100 can be connected to the implement frame 102 using any suitable technique or techniques. In the illustrated embodiment, the rotatable shaft 164 is connected to the implement frame 102 by one or more brackets 166 that retain the shaft in place (e.g., with bushings or bearings) while allowing it to rotate. The tool carousel 104 can be connected to the rotatable shaft 164 by linkages 168. The linkages 168 can be connected to the tool carousel 104 using any suitable technique or techniques. Although depicted as using two linkages 168 each connected to an end of the tool carousel 104, the implement 100 can include any suitable number of linkages that connect the carousel to the rotatable shaft 164. Also connected to the rotatable shaft 164 is carousel actuator 170. In particular, a first end 172 of the carousel actuator 170 is connected to an arm 167 of the rotatable shaft 164, and a second end 174 is connected to the frame 102. The carousel actuator 170 can include any suitable actuator that is configured to cause the rotatable shaft 164 to rotate about a shaft rotation axis 165.

To rotate the tool carousel 104 about the carousel axis 6, the operator can actuate the carousel actuator 170 using any suitable controller, e.g., carousel controller 38. The carousel actuator 170 extends or retracts, thereby causing the rotatable shaft 164 to rotate about the shaft axis 165. As the shaft 164 rotates, the linkages 168, which are fixedly attached to each end of the shaft 164, cause the carousel 104 to rotate, thereby causing the ground working tools 108, 110, 112 to rotate about the carousel axis 6. The rotatable shaft 164 and the actuator 170 can, therefore, secure each of the ground-working tools 108, 110, 112 in at least the first orientation (FIG. 12) and the second orientation (FIG. 13) as described herein. In one or more embodiments, the rotatable shaft 164 and the actuator 170 can secure each of the ground-working tools 108, 110, 112 in the third orientation (FIG. 14).

As mentioned herein, the implement 100 can include any suitable tools or devices that can be used to manipulate the ground surface 4. For example, implement 100 can also include a box blade 180 (FIG. 4) that is connected to the implement frame 102 using any suitable technique or techniques. The box blade 180 can be disposed in any suitable position relative to the tool carousel 104. In one or more embodiments, the box blade 180 is disposed between the tool carousel 104 and the rear wheels 20 as shown in FIGS. 1-3. The box blade 180 can take any suitable shape or shapes and have any suitable dimensions.

As shown in FIGS. 4-7, the box blade 180 includes a lower edge 182 that is configured to contact the ground surface 4. The box blade 180 also includes a box 184 that houses the lower edge 182. The box 184 can be configured to receive one or more portions of the ground surface 4 that are directed into the box by the lower edge 182. In one or more embodiments, the box blade 180 can be utilized to collect one or more portions of the ground surface 4 or other materials in the box 184 and deliver such material to a desired location. The box blade 180 can also include a cutting disc 183 (FIG. 15) that is disposed proximate an end 185 of the lower edge 182. The cutting disc 183 can take any suitable shape or shapes and have any suitable dimensions. Although depicted as having a single cutting disc 183, the box blade 180 can include any suitable number of cutting discs. Further, the box blade 180 can include one or more additional cutting discs disposed proximate a second end of the lower edge 182 (not shown). The cutting disc 183 can be configured to cut away portions of turf. Such cutting disc 183 can, therefore, assist in defining an edge of the turf in relation to a transition area between the turf and dirt sections, e.g., on a baseball or softball field. Although described as including the cutting disc 183, the box blade 180 can include any suitable tool or tools that can be connected to the box 184 or other portion or portions of the box blade using any suitable technique or techniques as is further described herein.

Figure 15:
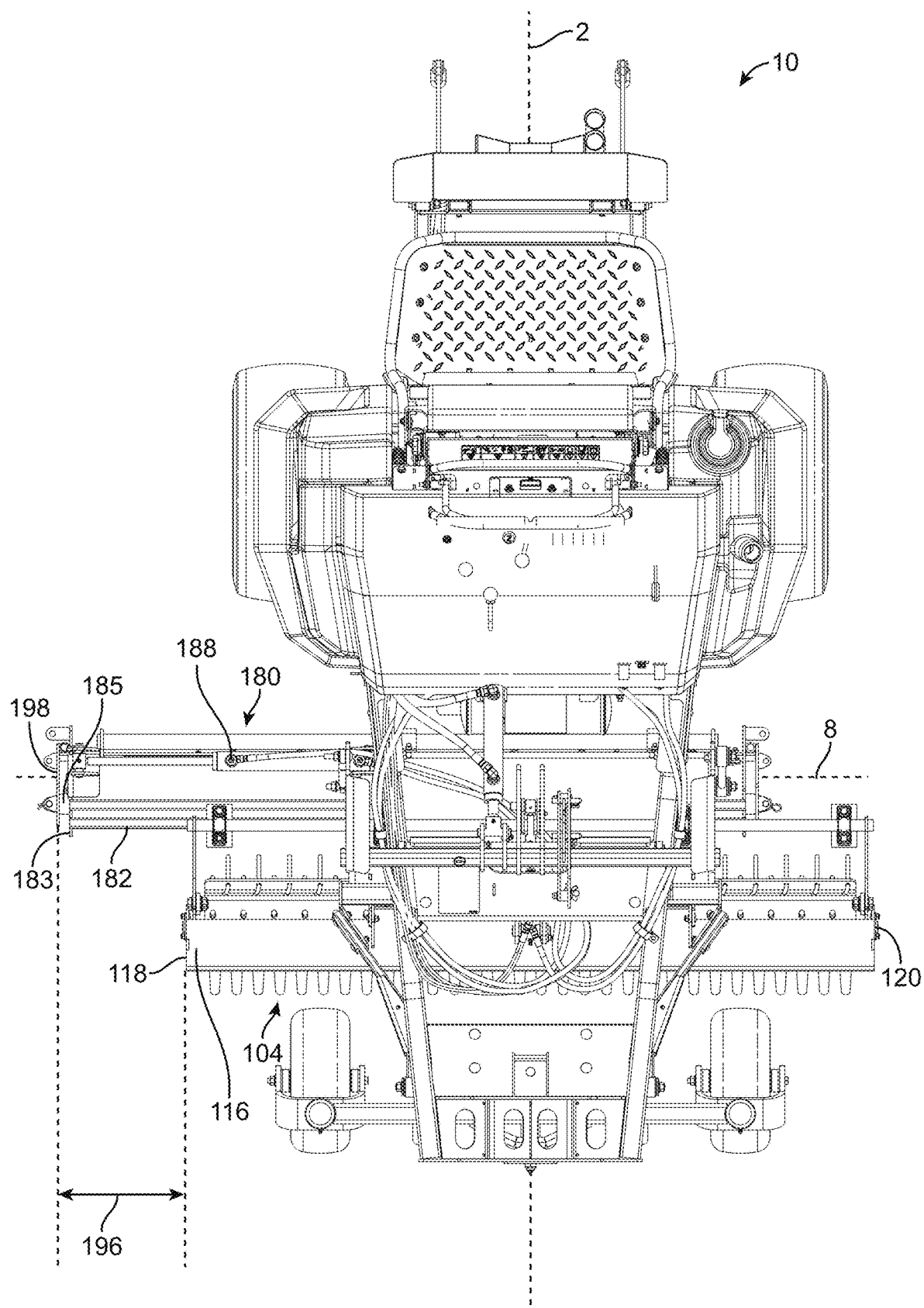
FIG. 15 is a top plan view of the vehicle of FIG. 1 with a box blade of the implement extended in a lateral direction.

In one or more embodiments, the box blade 180 can be configured to be translated along the lateral axis 8 as shown in FIGS. 3 and 15 to manipulate portions of the ground surface 4 without driving over such portions with wheels 18, 20. The lateral axis 8 is disposed in a vertical plane orthogonal to the longitudinal axis 2. Any suitable technique or techniques can be utilized to translate the box blade 180 along the lateral axis 8. For example, the implement 100 can include an actuator 188 that is connected to the frame 102 of the implement. The actuator 188 can include any suitable actuator or actuators. Further, the actuator 188 can be connected to any suitable controller or lever that is configured to actuate the actuator. To allow for the box blade 180 to translate laterally, the box 184 can be connected to the frame 102 of the implement 100 along rail 190 using any suitable technique or techniques, e.g., brackets 192. The rail 190 is configured to translate along the axis 8 by sliding within the brackets 192. The box 184 of the box blade 180 can also include grooved rail 194 that is configured to slidably engage the frame 102 such that the box blade 180 can be translated along the lateral axis 8.

The actuator 188 is configured to translate the box blade 180 along the axis 8 as can be seen in FIG. 15. The box blade 180 can be translated any suitable distance 196 as measured between the end 198 of the box blade and the first end 118 of the frame 116 of the tool carousel 104. Although depicted in FIG. 15 as being translated in a direction on a right side of the vehicle 10, the box blade 180 can be translated along the lateral axis 8 on either the right or a left side of the vehicle. Further, in one or more embodiments, the box blade 180 can be rotated relative to the frame 102 of the implement along the axis 8 (e.g., along an axis substantially parallel to the lateral axis 8) using any suitable technique or techniques.

As stated herein, the implement 100 can be raised or lowered relative to the chassis 12 of the vehicle 10 using any suitable technique or techniques. Although not shown, in one or more embodiments, the vehicle 10 and the implement 100 can be configured to raise or lower the tool carousel 104 relative to the box blade 180 using any suitable technique or techniques, e.g., one or more of the techniques described herein regarding raising and lowering of the implement 100 relative to the chassis 12 of the vehicle.

Figure 16:
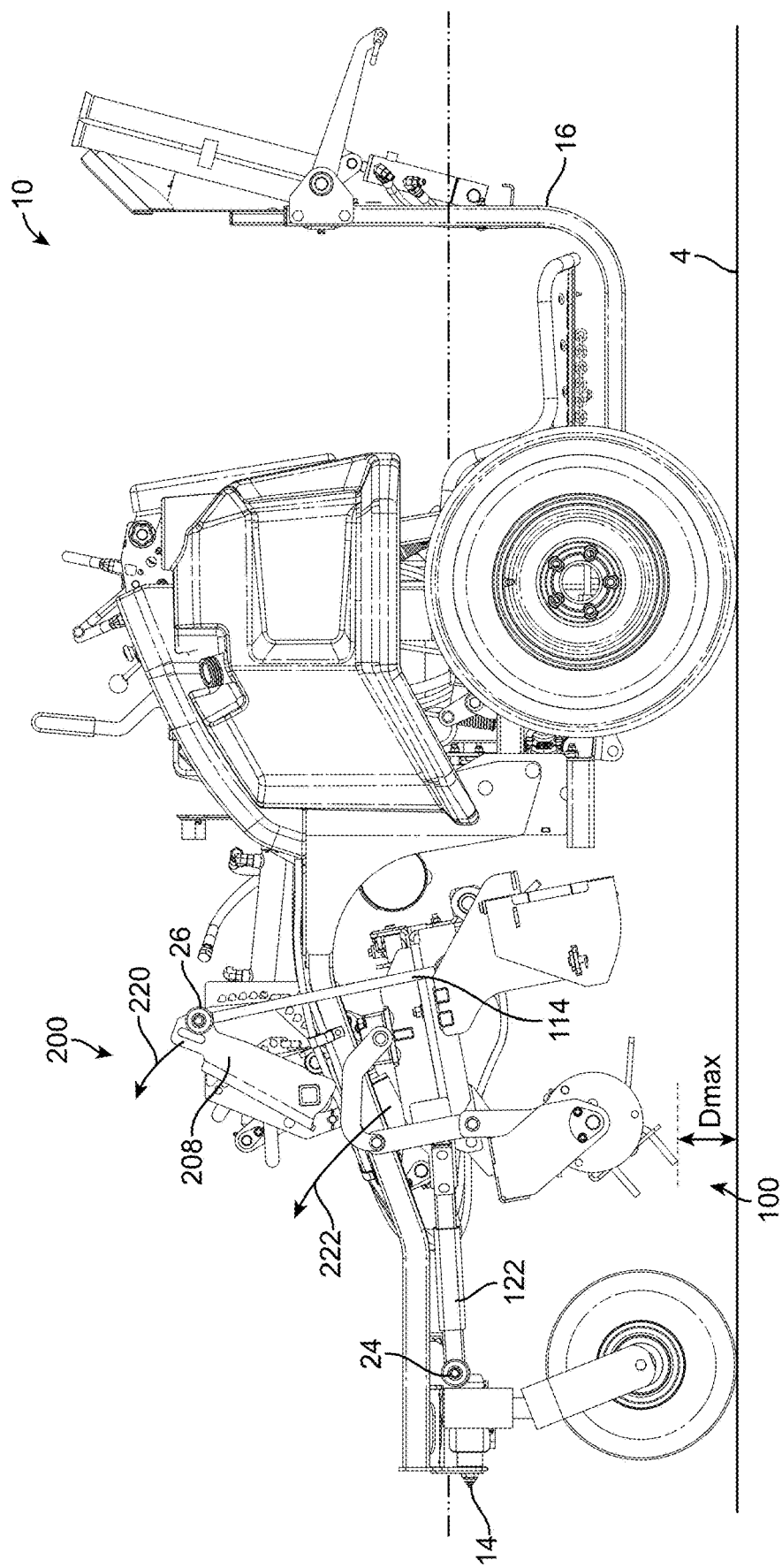
FIG. 16 is a side view of the vehicle of FIG. 1 with the implement in a raised position.

The vehicle 10 can be configured to position the implement 100 at a maximum distance $D_{max}$ and a minimum distance $D_{min}$ from the ground surface 4. For example, FIG. 16 is a side view of the vehicle 10 with the implement 100 at the maximum distance $D_{max}$ from the ground surface 4 such that the implement is in a raised position. The maximum and minimum distances between the implement 100 and the ground surface 4 can be measured in a direction orthogonal to the ground surface 4 and between such ground surface and a portion of the implement closest to the ground surface.

Figure 17:
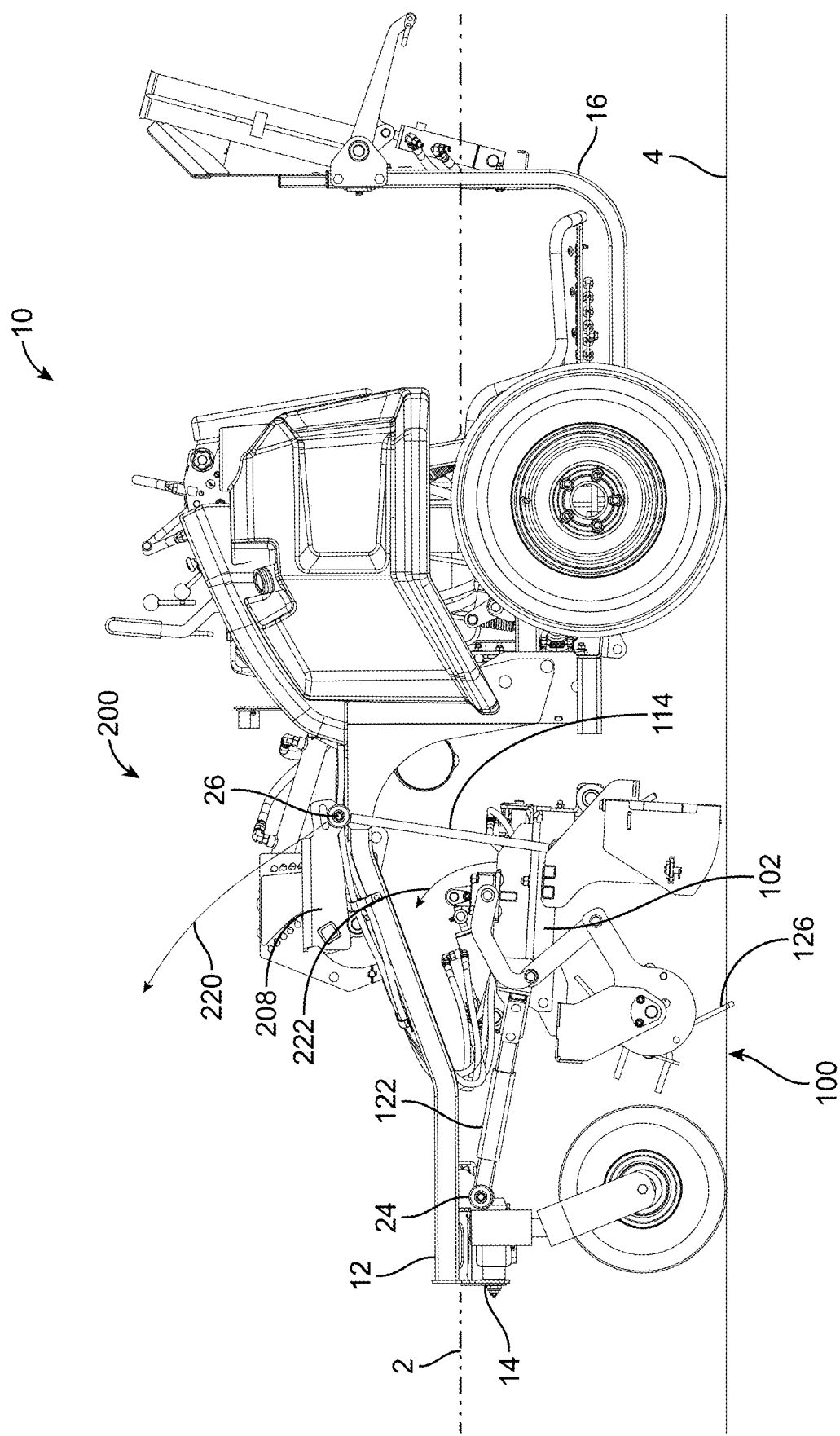
FIG. 17 is a side view of the vehicle of FIG. 1 with the implement in a lowered position.

Further, FIG. 17 illustrates the implement 100 in a lowered position, where the implement is at the minimum distance D$_{rain}$ from the ground surface 4. The minimum distance D$_{min}$ can be any suitable distance. In one or more embodiments, the minimum distance D$_{min}$ can be zero, i.e., a portion of the implement is in contact with the ground surface 4. For example, at least one of the tines of the plurality of tines 126 of the first ground-working tool 108 can be in contact with the ground surface 4 such that the tool can manipulate the surface. In one or more embodiments, a portion or portions of the implement 100 can penetrate the ground surface, e.g., one or more of the tines 126 are disposed within the ground surface 4 as shown in FIG. 17. The implement 100 can penetrate the ground surface 4 any suitable depth. In one or more embodiments, the lower edge 182 of the box blade 180 can penetrate the ground surface 4 any suitable depth.

Any suitable mechanism or system can be utilized to raise and lower the implement 100 relative to the ground surface 4. For example, the implement 100 is connected to the chassis 12 of the vehicle 10 by the arms 122 and links 114. The arms 122 are connected to pivot points 24 of the chassis 12 using any suitable technique or techniques and can rotate about such pivot point. Further, the links 114 are connected to pivot points 26 (FIG. 17) that are disposed on pivot mechanism 200 that is connected to the chassis 12. The links 114 are configured to rotate about the pivot points 26 as the implement 100 is raised and lowered. The links 114 can be connected to the frame 102 of the implement 100 and to the pivot points 26 of the pivot mechanism 200 using any suitable technique or techniques.

Figure 18:
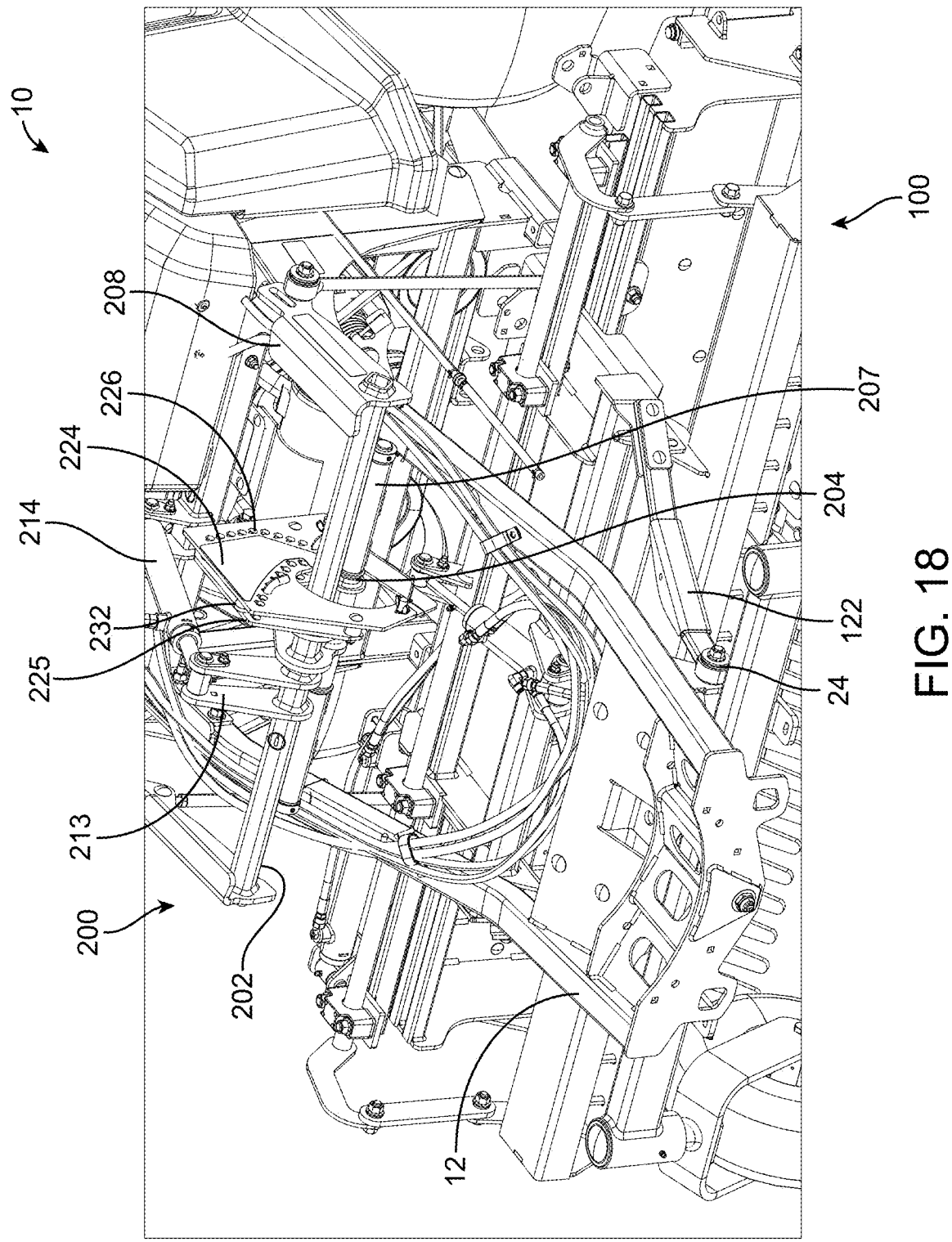
FIG. 18 is a perspective view of a pivot mechanism of the vehicle of FIG. 1.
Figure 19:
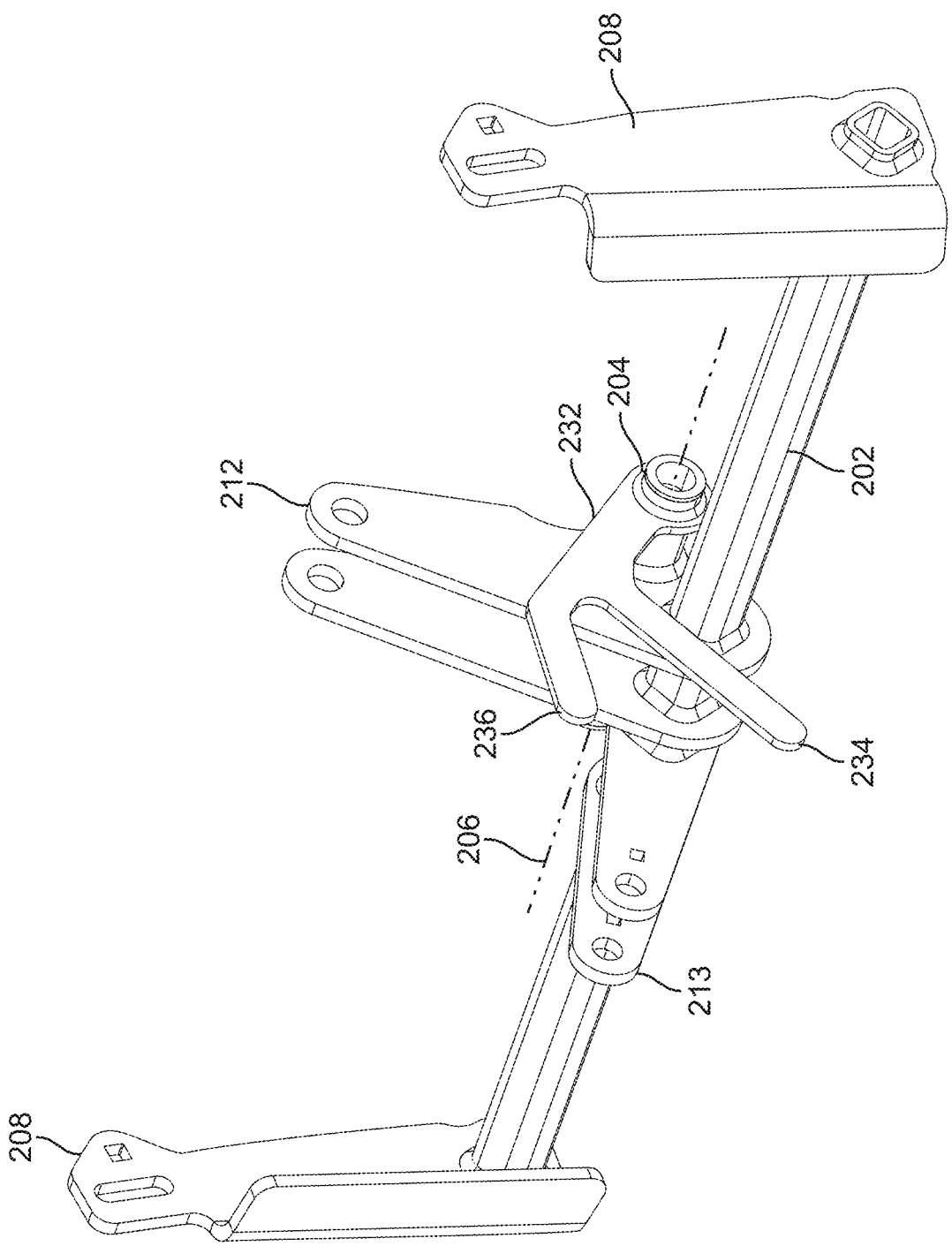
FIG. 19 is a perspective view of a pivot weldment of the pivot mechanism of FIG. 18.

FIG. 18 is a perspective view of a portion of the vehicle 10 that includes the pivot mechanism 200, and FIG. 19 is a perspective view of a portion of the pivot mechanism. As can be seen in FIGS. 18-19, the pivot mechanism 200 includes a pivot weldment 202 that is connected to a pivot shaft 204 by an actuator arm 212. The pivot shaft 204 is fitted over a lateral rod 207 (FIG. 18) that is connected to the frame 102. As the pivot mechanism 200 is manipulated, the pivot shaft 204 rotates around the lateral rod 207 such that the pivot weldment 202 moves in an arcuate path about the lateral rod and the pivot shaft.

The pivot weldment 202 further includes end plates 208. The end plates 208 can take any suitable shape or shapes and have any suitable dimensions. The end plates 208 are configured to connect the pivot mechanism 200 to the links 114 of the implement 100 (FIG. 16) using any suitable technique or techniques.

The pivot weldment 202 also includes an actuator arm 213 that is configured to connect the pivot mechanism 200 to a pivot actuator 214 (FIG. 18). The pivot actuator 214 can include any suitable actuator. As shown, the pivot actuator 214 is a hydraulic cylinder that is configured to expand and contract based upon a control signal from the pivot controller 40. The pivot actuator 214 is connected between the pivot mechanism 200 and the chassis 12. Further, the pivot actuator 214 is configured to rotate the pivot shaft 204 of the pivot mechanism 200 about the rod 207 that is connected to the chassis 12.

To raise and lower the implement 100, a signal from the pivot controller 40 activates the pivot actuator 214, which either extends or retracts. When it extends, from a retracted position, the pivot actuator 214 moves the actuator arm 213 generally in a direction away from the rear end 16 of the vehicle 10. The actuator arm 212 in turn rotates the pivot weldment 202 about a pivot shaft axis 206 (FIG. 19), thereby rotating the end plates 208 in a direction away from the rear end 16 of the vehicle 10 as indicated by arrow 220 in FIG. 17. The end plates 208 engage the links 114 of the implement 100 and cause such links to move in a generally upward direction away from the ground surface 4 as indicated by arrow 222 in FIG. 17. Movement of the links 114 in this direction raises the implement 100 in a direction generally away from the ground surface 4. Because the implement 100 is connected to the pivot points 26 of the pivot mechanism 200 by links 114 and the pivot points 24 on the chassis 12 by arms 122, the implement 100 when raised moves in an upward, arcuate path as indicated by arrow 222 as it is constrained by the pivot points.

Figure 20:
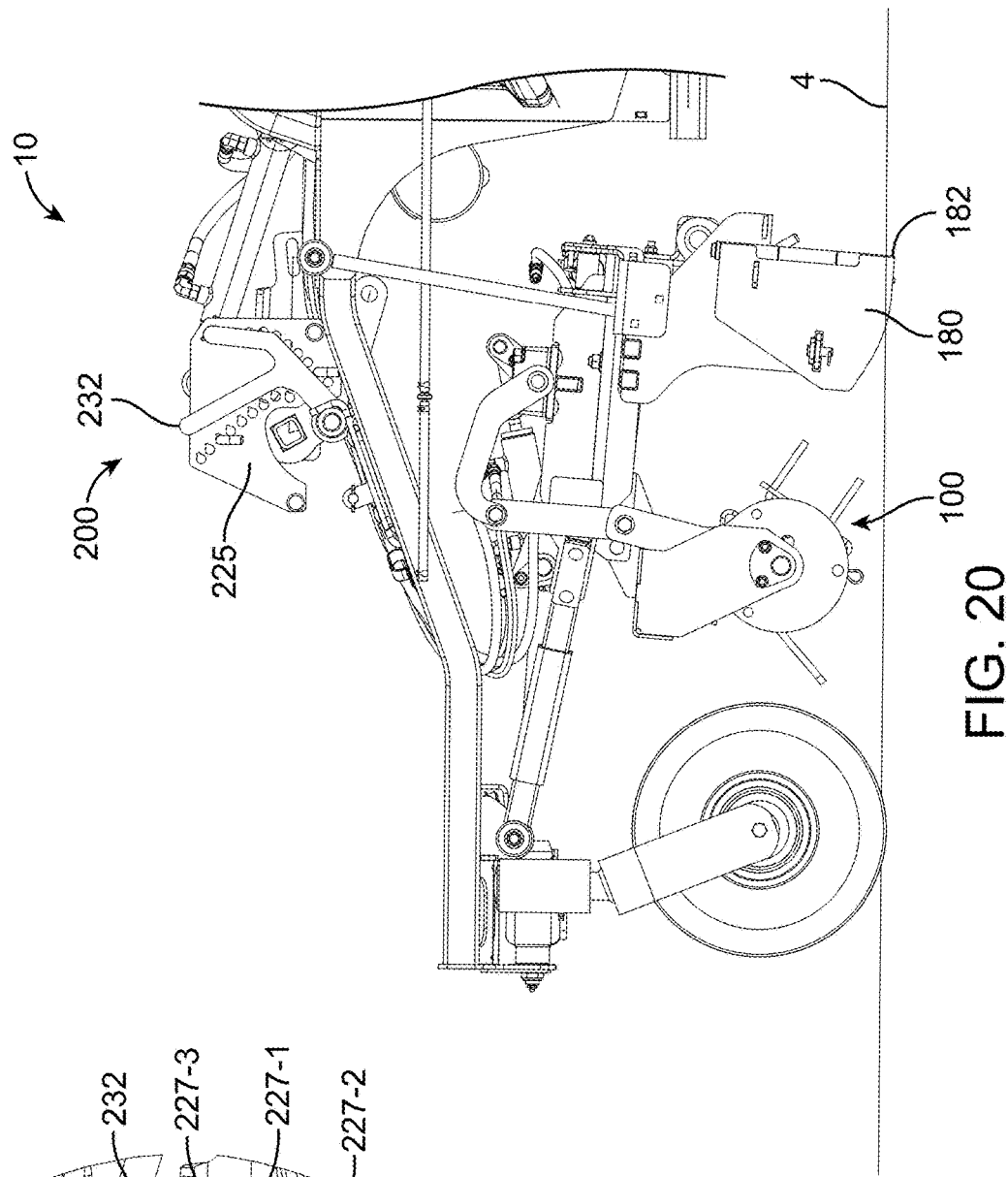
FIG. 20 is a side view of the pivot mechanism of FIG. 18 with the mechanism in a down stop position.
Figure 21:
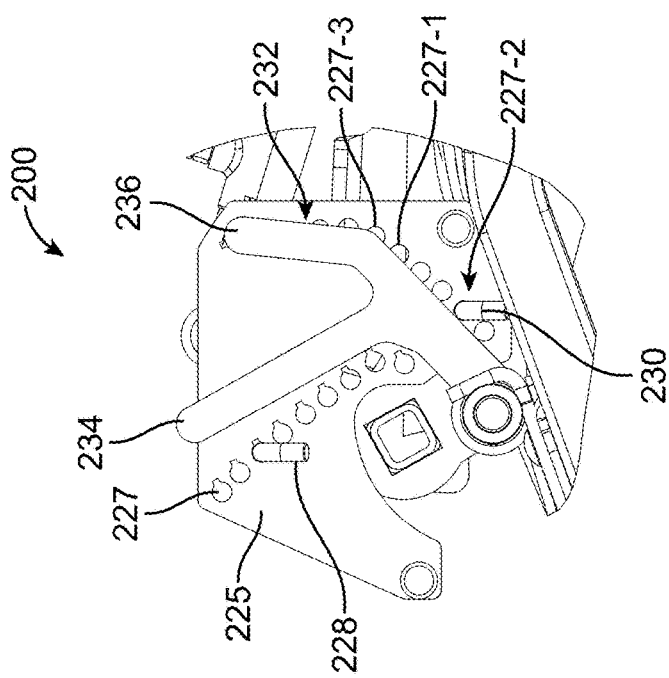
FIG. 21 is a side view of a portion of the pivot mechanism of FIG. 18 with the mechanism in the down stop position.

In one or more embodiments, the pivot mechanism 200 can include at least one of an up stop or a down stop that can be adjusted by the operator to limit movement of the implement 100 relative to the ground surface 4. For example, as shown in FIGS. 18 and 20-23, the pivot mechanism 200 includes a plate 224 that is connected to the chassis 12 of the vehicle 10. The plate 224 includes two or more slots 226 that are configured to receive a pin. As shown in FIGS. 18 and 20-21, the pivot mechanism 200 can also include an optional second plate 225 that is connected to the chassis 12 of the vehicle 10 and that includes two or more slots 227 that align with the slots 226 of the plate 224. The plate 224 has been removed from FIGS. 20-23 for explanatory purposes.

The pivot mechanism 200 also includes a stop arm 232 that is connected to the pivot shaft 204 using any suitable technique or techniques. The stop arm 232 can take any suitable shape or shapes and have any suitable dimensions. The stop arm 232 includes a first fork 234 and a second fork 236. The first fork 234 is configured to engage an up stop pin 228, and the second fork 236 is configured to engage a down stop pin 230. The stop arm 232 is disposed between the plate 224 and the second plate 225 as shown in FIG. 18.

The up stop pin 228 and the down stop pin 230 can be disposed in any suitable slot 226, 227 of the plate 224 and second plate 225. In one or more embodiments, the slots 226, 227 are configured to demarcate selected distances between the implement 100 and the ground surface 4. For example, each slot 226, 227 can progress in any suitable increment, e.g., an increment of 0.5 inches. As shown in FIG. 21, slots 227, which corresponds to slots 226 in the plate 224, include a zero slot 227-1, which may be calibrated to the implement 100 being in contact with the ground surface 4 but not penetrating the ground surface to any appreciable depth. In one or more embodiments, the implement 100 can be lowered onto a rigid surface such as a concrete pad to calibrate the zero slot 227-1 and level the implement along at least one of the carousel axis 6 or the lateral axis 8. Any suitable technique or techniques can be utilized to set the implement 100 in a leveled orientation relative to at least one of the carousel axis 6 or lateral axis 8. In one or more embodiments, the carousel axis 6 is substantially parallel to the lateral axis 8. The plates 224, 225 can be adjusted such that the zero slot 227-1 indicates that the implement is in contact with the ground surface 4, i.e., the pivot mechanism 200 can be zeroed out prior to manipulation of the ground surface. In use, the second fork 236 of the stop arm 232 engages the down stop pin 230 such that the pivot mechanism 200 is prevented from rotating in a direction toward the rear end 16 of the vehicle 10. The stop arm 232 and the down stop pin 230, therefore, set the down stop for the implement 100 in relation to the ground surface 4.

Further, slots 227 can include a −0.5 inch slot 227-2, which demarcates the implement penetrating the ground surface 0.5 inches. For example, when the down stop pin 230 is disposed in the −0.5 inch slot 227-2, the second fork 236 of the stop arm 232 engages the down stop pin 230 such that the implement will penetrate the ground 0.5 inches, e.g., the lower edge 182 of the box blade 180 will penetrate the ground surface 0.5 inches. The down stop pin 230 prevents the pivot mechanism 200 from rotating about the pivot shaft 204 toward the rear end 16 of the vehicle 10 such that the implement cannot be lowered any further relative to the ground surface 4. FIG. 20 illustrates the lower edge 182 of the box blade 180 penetrating the ground surface 4 at a depth of 0.5 inches. The pivot actuator 214 can be activated to hold the stop arm 232 against the down stop pin 230 such that the implement 100 remains at the desired minimum distance from the ground surface 4 or at the desired penetration depth within the ground surface.

Further, the slots 226, 227 can also include a positive 0.5 slot 227-3. When the down stop pin 230 is disposed in slot 227-3, the second fork 236 of the stop arm 232 engages the pin, which prevents the pivot mechanism 200 from rotating any further toward the rear end of the vehicle 10, thereby holding the implement in a position of no closer to the ground surface 4 than 0.5 inches above such ground surface.

The pivot mechanism 200 is also configured to provide an up stop that sets the maximum distance $D_{max}$ between the implement 100 and the ground surface 4. For example, the slots 226, 227 can include incremental positions for the up stop pin 228 to be disposed such that the operator can select $D_{max}$. When actuating the pivot mechanism 200, the first fork 234 of the stop arm 232 is configured to engage the up stop pin 228 (FIG. 23), which is positioned in a desired slot corresponding to such maximum distance. When the first fork 234 of the stop arm 232 engages the up stop pin 228, the pivot mechanism 200 can no longer be rotated in a direction toward the front end 14 of the vehicle 10. Because of this restriction in rotation in the forward direction, the implement 100 cannot be raised any further, thereby setting $D_{max}$. FIG. 22 illustrates the implement 100 disposed at the maximum distance $D_{max}$ from the ground surface 4 when the first fork 234 of the stop arm 232 is engaged with the up stop pin 228. The pivot actuator 214 can be activated to hold the stop arm 232 against the up stop pin 228 such that the implement remains at the maximum distance $D_{max}$ from the ground surface 4.

The various embodiments of vehicles described herein can include any suitable pivot mechanisms for raising and lowering implements that are connected to the vehicle. For example, FIGS. 25-31 are various views of another embodiment of a grounds maintenance vehicle 500. All design considerations and possibilities described herein regarding the ground maintenance vehicle 10 of FIGS. 1-23 apply equally to the ground maintenance vehicle 500 of FIGS. 25-31. The vehicle 500 includes a chassis 512 and a ground-working implement 600 connected to the chassis between front wheels 518 and rear wheels 520 that support the chassis on a ground surface 504. The chassis 512 has a front end 514, a rear end 516, and a longitudinal axis 502 that extends between the front end and the rear end. The vehicle 500 can further include an operator control system 530 that can include a laser guide (not shown) that can be mounted on a support 762 that is connected to the chassis 512 using any suitable technique or techniques.

The ground-working implement 600 includes an implement frame 602 and a tool carousel 604 rotatably connected to the implement frame. The implement 600 can also include a box blade 680 that is connected to the frame 602 using any suitable technique or techniques. The box blade 680 includes a lower edge 682 that is configured to contact the ground surface 504. The box blade 680 also includes a box 684 that houses the lower edge 682.

The implement 600 can be connected to the chassis 512 of the vehicle 500 using any suitable technique, e.g., the same techniques described herein regarding implement 100 of FIGS. 1-23. As illustrated, the implement 600 is connected to the chassis 512 by one or more arms 612 that extend from the frame 602 of the implement. The arms 612 are connected to pivot points 524 disposed on the chassis 512. The implement 600 is further connected to the chassis 512 by one or more links 614 that are each connected to the chassis 512 at a pivot point 526. The links 614 are further connected to a pivot mechanism 700 that is configured to raise and lower the implement 600 using any suitable technique or techniques. The links 614 are configured to rotate about the pivot points 526 as the implement 600 is raised and lowered.

Figure 27:
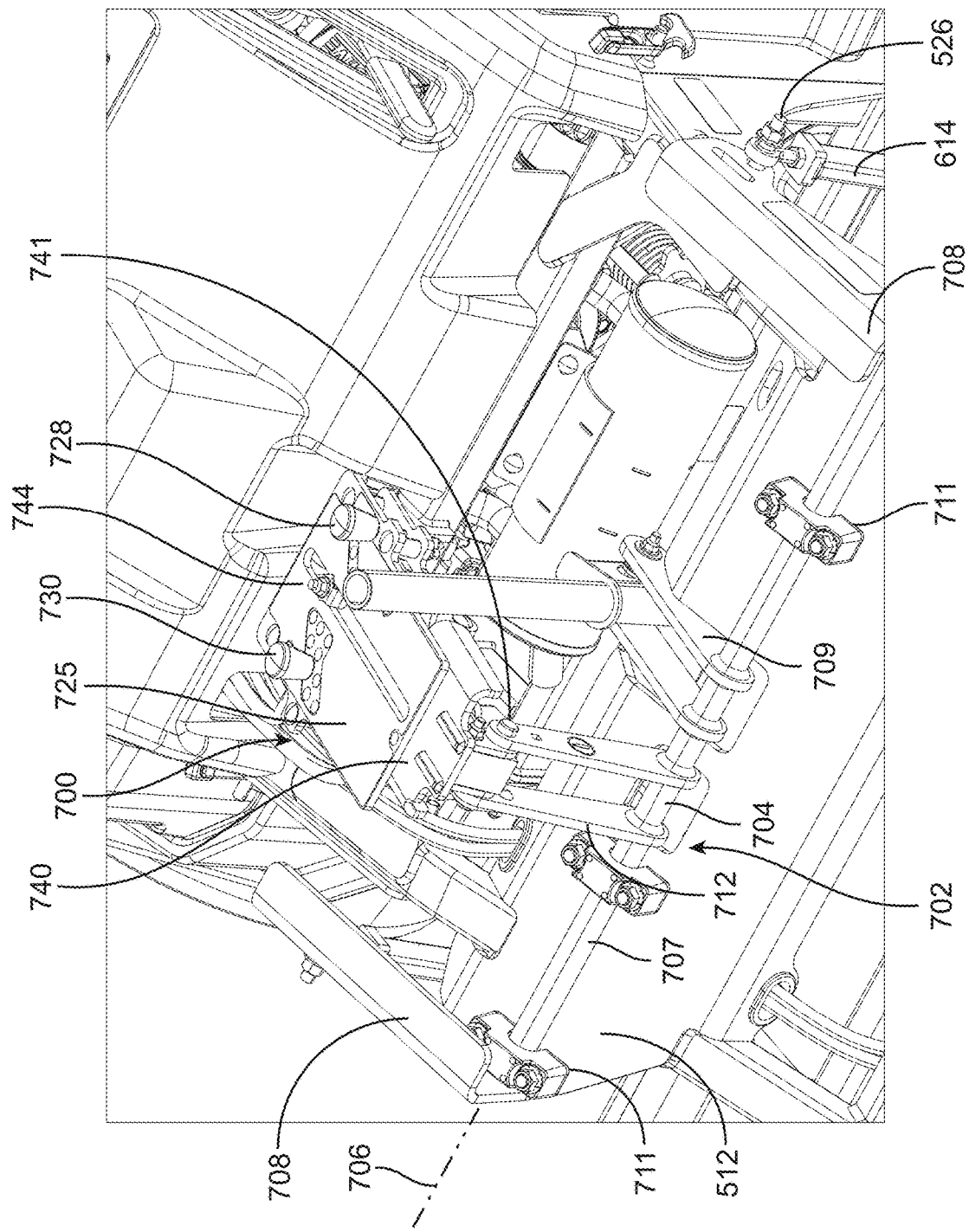
FIG. 27 is a perspective view of a pivot mechanism of the vehicle of FIG. 25

FIG. 27 is a perspective view of a portion of the vehicle 500. As can be seen in FIG. 27, the pivot mechanism 700 includes a pivot weldment 702 that is connected to a pivot shaft 704 by an actuator arm 712. The pivot shaft 704 is fitted over a lateral rod 707 that is connected to the chassis 512 by bracket 709 and brackets 711. As the pivot mechanism 700 is manipulated, the pivot shaft 704 rotates about the lateral rod 207 such that the pivot weldment 702 moves in an arcuate path about the lateral rod and the pivot shaft.

The pivot weldment 702 further includes end plates 708 that can take any suitable shape or shapes and have any suitable dimensions. The end plates 708 are configured to connect the pivot mechanism 700 to the links 614 of the implement 600 using any suitable technique or techniques.

Figure 28:
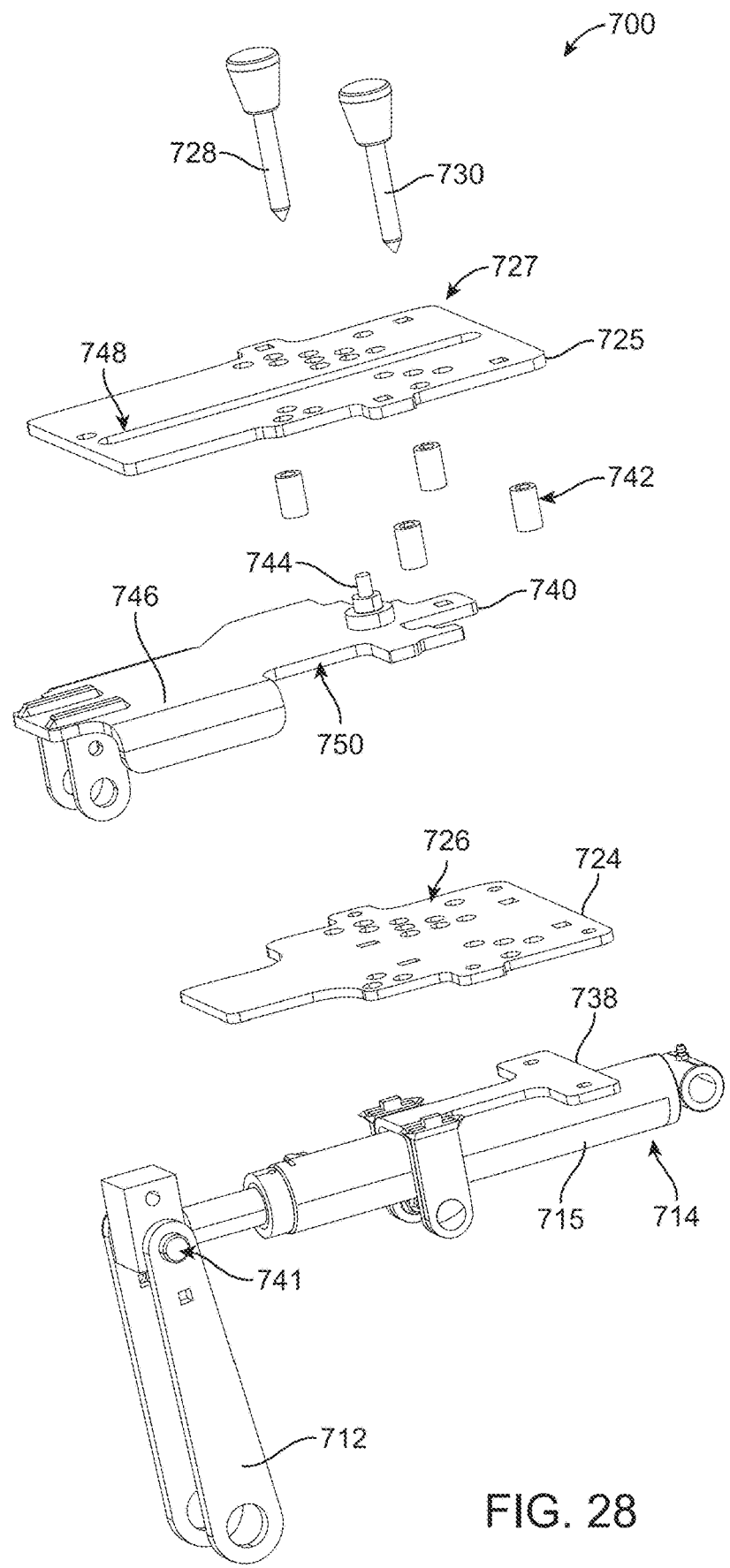
FIG. 28 is an exploded view of a portion of the pivot mechanism of FIG. 27.
Figure 29:
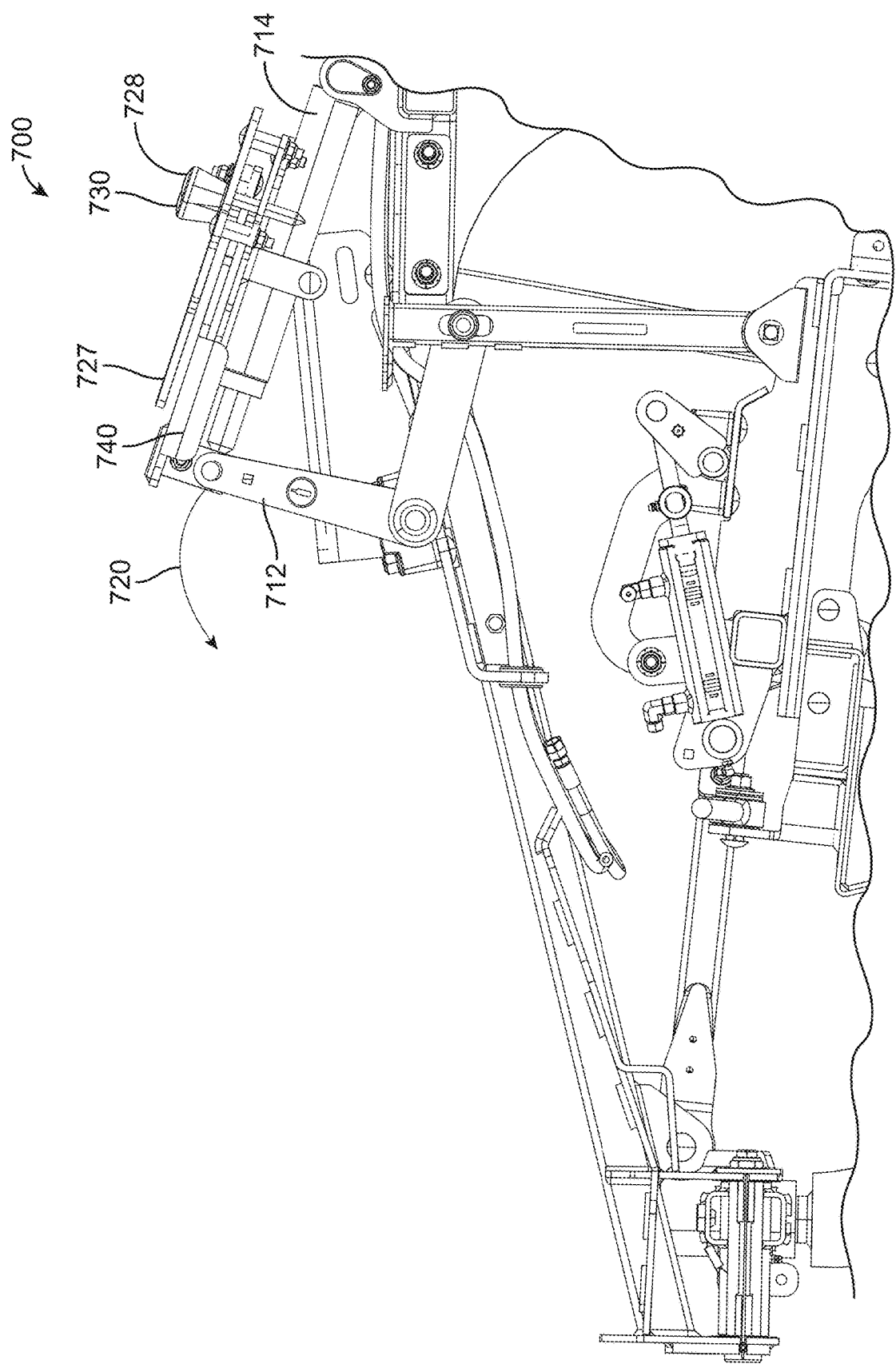
FIG. 29 is a side view of the pivot mechanism of FIG. 27.

The pivot weldment 702 also includes the actuator arm 712 that is configured to connect the weldment to a pivot actuator 714 (FIG. 28). The pivot actuator 714 can include any suitable actuator. As shown, the pivot actuator 714 is a hydraulic cylinder that is configured to expand and contract based upon a control signal from a pivot controller 540 (FIG. 26) of the operator control system 530. The pivot actuator 714 is connected between the pivot mechanism 700 and the chassis 512. Further, the pivot actuator 714 is configured to rotate the pivot shaft 704 of the pivot mechanism 700 about the rod 707 that is connected to the chassis 512.

To raise and lower the implement 600, a signal from the pivot controller 540 activates the pivot actuator 714, which either extends or retracts. When it extends, from a retracted position, the pivot actuator 714 moves the actuator arm 712 generally in a direction away from the rear end 516 of the vehicle 500. The actuator arm 712 in turn rotates the pivot weldment 702 about a pivot shaft axis 706 (FIG. 27), thereby rotating the end plates 708 in a direction away from the rear end 516 of the vehicle 500 as indicated by arrow 720 in FIG. 29. The end plates 708 engage the links 614 of the implement 600 and cause such links to move in a generally upward direction away from the ground surface 504. Movement of the links 614 in this direction raises the implement 600 in a direction generally away from the ground surface 504. Because the implement 600 is connected to the pivot points 526 of the pivot mechanism 700 by links 614 and the pivot points 524 by arms 612, the implement 600 when raised moves in an upward, arcuate path as it is constrained by the pivot points.

In one or more embodiments, the pivot mechanism 700 can include at least one of an up stop or a down stop that can be adjusted by the operator to limit movement of the implement 600 relative to the ground surface 504. For example, the pivot mechanism 700 includes a first fixed plate 724 that is connected to a body 715 of the pivot actuator 714 by a bracket 738 (FIG. 28). The first fixed plate 724 includes two or more slots 726 that are configured to receive one or more up stop pins 728 and down stop pins 730. The pivot mechanism 700 can also include a second fixed plate 725 that is connected to the first fixed plate 724 using any suitable technique or techniques. In one or more embodiments, one or more spacers 742 can be disposed between the first fixed plate 724 and the second fixed plate 725 to maintain a gap or space between the fixed plates. The second fixed plate 725 includes two or more slots 727 that are configured to receive one or more of the up and down stop pins 728, 730. The slots 727 of the second fixed plate 725 are aligned with the slots 726 of the first fixed plate 724 such that the stop pins 728, 730 can be inserted through both fixed plates. In one or more embodiments, the slots 727 of the second fixed plate 725 (and corresponding slots 726 of the first fixed plate 724) can include one or more storage slots 727-5 (FIG. 30) that are configured to store the stop pins 728, 730 when not in use.

The pivot mechanism 200 also includes a sliding plate 740 that is disposed between the first and second fixed plates 724, 725 and that is configured to slide relative to the fixed plates in a direction along the longitudinal axis 502 as the fixed plates remain fixed relative to the chassis 512. The sliding plate 740 is connected to a pivot point 741 that in turn can be connected to the actuator arm 712 and the pivot actuator 714 such that the plate slides between the fixed plates 724, 725 when the pivot actuator is actuated. The sliding plate 740 includes an indicator 744 that extends from a major surface 746 of the plate and that is configured to extend through an elongated slot 748 disposed in the second fixed plate 725. The indicator 744 is configured to indicate to the operator a position of the implement 600 relative to the ground surface 504. The second fixed plate 725 can include first indicia 729 (FIG. 30) that can indicate that the implement is above the ground surface 504 (i.e., above grade) when the indicator 744 is positioned adjacent to the first indicia, and second indicia 731 that can indicate that the implement has penetrated the ground surface (i.e., below grade) when the indicator is positioned adjacent to the second indicia. Such indicia 729, 731 can include any suitable text, numbers, or icons. In one or more embodiments, the indicia 729, 731 can be color-coded, with one color representing that the implement 600 is above the ground surface 504 and a second color indicating that the implement has penetrated the ground surface. The second fixed plate 725 can also include third indicia 733 that can indicate that the implement 600 is on the ground surface 504 but not penetrating such ground surface when the indicator 744 is positioned adjacent to such third indicia. The sliding plate 740 further includes one or more incrementing ledges 750 that are configured to engage one or more of the stop pins 728, 730 and provide one or more up stops and down stops of the pivot mechanism 700.

Figure 30:
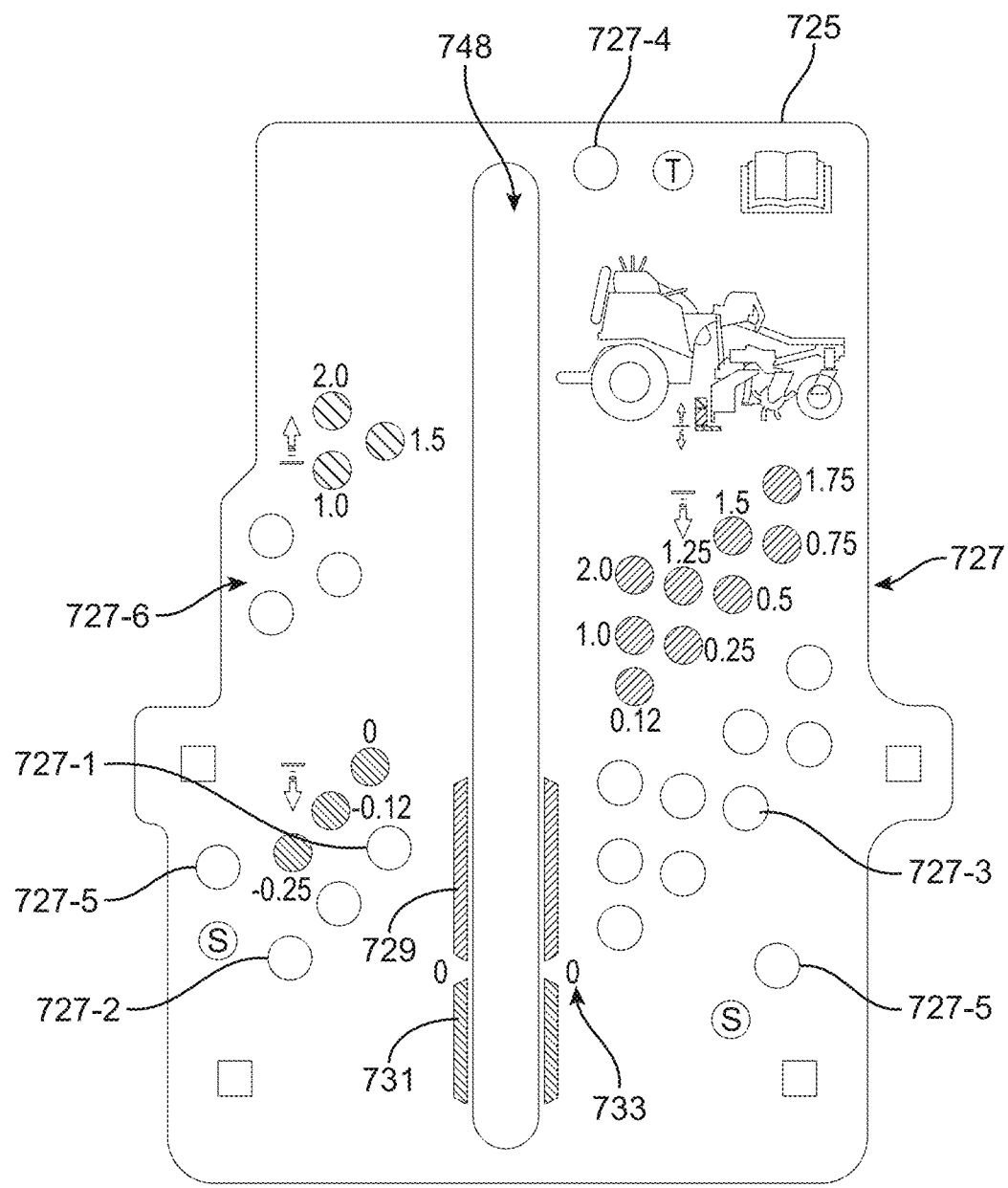
FIG. 30 is a plan view of a second fixed plate of the pivot mechanism of FIG. 27.

As shown in FIG. 30, the slots 727 of the second fixed plate 725 (and corresponding slots 726 of the first fixed plate 724) can be configured to demarcate selected distances between the implement 600 and the ground surface 504. For example, each slot 727 can progress in any suitable increment, e.g., increments of 0.25 inches. As shown in FIG. 30, slots 727 (and corresponding slots 726 of first fixed plate 724) include a zero slot 727-1, which may be calibrated to the implement 600 being in contact with the ground surface 504 but not penetrating the ground surface to any appreciable depth. In one or more embodiments, the implement 600 can be lowered onto a rigid surface such as a concrete pad to calibrate the zero slot 727-1 and level the implement along at least one of the carousel axis 706 or a lateral axis (e.g., lateral axis 8 of vehicle 10 of FIGS. 1-23). Any suitable technique or techniques can be utilized to set the implement 600 in a leveled orientation relative to at least one of the carousel axis 706 or lateral axis (e.g., lateral axis 8 of FIG. 15). In one or more embodiments, the carousel axis 706 is substantially parallel to the lateral axis. The fixed plates 724, 725 can be adjusted such that the zero slot 727-1 indicates that the implement 600 is in contact with the ground surface 504, i.e., the pivot mechanism 700 can be zeroed out prior to manipulation of the ground surface. In use, a down stop pin 730 can be inserted into the zero slot 727-1 such that the sliding plate 740 engages the stop pin to prevent the pivot mechanism 700 from rotating in a direction toward the rear end 516 of the vehicle 500. The down stop pin 730, therefore, sets the down stop for the implement 600 in relation to the ground surface 504.

Further, slots 727 can include a −0.25 inch slot 727-2, which demarcates the implement penetrating the ground surface 0.25 inches. For example, when a down stop pin 730 is disposed in the −0.25 inch slot 227-2, the pin engages the sliding plate 740 when the implement 600 penetrates the ground to a depth of 0.25 inches, e.g., the lower edge 682 of the box blade 680 will penetrate the ground surface 0.25 inches. The down stop pin 730 prevents the pivot mechanism 700 from rotating about the pivot shaft 704 toward the rear end 516 of the vehicle 500 such that the implement 600 cannot be lowered any further relative to the ground surface 504. The pivot actuator 714 can be activated to hold the sliding plate 740 against the down stop pin 730 such that the implement 600 remains at the desired minimum distance from the ground surface 504 or at the desired penetration depth within the ground surface. The indicator 744 can be positioned within the elongated slot 748 to indicate to the operator that the implement 600 is penetrating the ground at a depth of −0.25 inches.

Further, the slots 727 of the second fixed plate 725 can also include a positive 0.5 inch slot 727-3. When the down stop pin 730 is disposed in slot 227-3, the sliding plate 740 engages the pin, which prevents the pivot mechanism 700 from rotating any further toward the rear end 516 of the vehicle 500, thereby holding the implement in a position of no closer to the ground surface 504 than 0.5 inches above such ground surface. The indicator 744 can be positioned within the elongated slot 748 to indicate to the operator that the implement 600 is positioned at 0.5 inches above the ground surface 504.

The pivot mechanism 700 is also configured to provide an up stop that sets a maximum distance (e.g., maximum $D_{max}$ of FIG. 16) between the implement 600 and the ground surface 504. For example, the slots 727 of the second fixed plate 725 (and corresponding slots 726 of first fixed plate 724) can include slots 727-6 that provide incremental positions for the at least one of the up stop pins 728 to be disposed such that the operator can select $D_{max}$. Further, when actuating the pivot mechanism 700, the sliding plate 740 can be configured to engage the up stop pin 728 when it is positioned in a transport slot 727-4 corresponding to such maximum distance between the implement 600 and the ground surface 504. When the sliding plate 740 engages the up stop pin 728 that is disposed in the transport slot 727-4, the pivot mechanism 700 can no longer be rotated in a direction toward the front end 514 of the vehicle 500. Because of this restriction in rotation in the forward direction, the implement 600 cannot be raised any further, thereby setting $D_{max}$. The pivot actuator 714 can be activated to hold the sliding plate 740 against the up stop pin 728 that is disposed in the transport slot 727-4 such that the implement remains at the maximum distance $D_{max}$ from the ground surface 504. Further, the indicator 744 can be positioned within the elongated slot 748 to indicate to the operator that the implement 600 is positioned at $D_{max}$.

Figure 31:
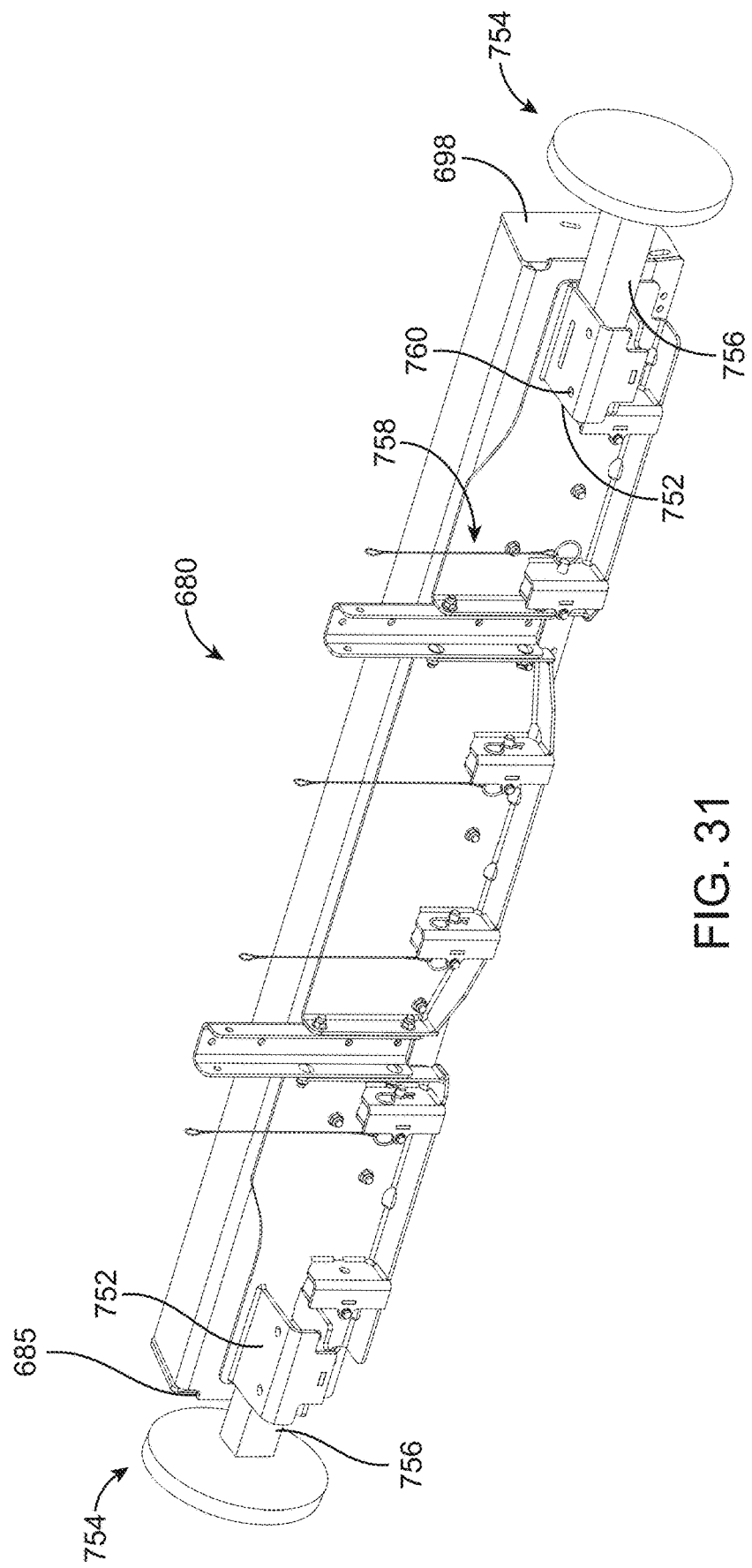
FIG. 31 is a rear perspective view of a box blade of the vehicle of FIG. 25

The box blade 680 of the vehicle 500 includes one or more attachment receivers 752 connected to the box 684 of the box blade as shown in FIG. 31. The receivers 752 can be disposed on any suitable portion or portions of the box 684. In the illustrated embodiment, the receivers 752 are disposed proximate to a first end 685 and a second end 698 of the box 684. One or more box blade tools 754 can be connected to the box 684 via the receivers 752 using any suitable technique or techniques. In one or more embodiments, the box blade tool 754 can be connected to a shaft 756 that is inserted into the receiver 752 and fixed in place within the receiver using any suitable technique or techniques. In one or more embodiments, the box blade tool 754 can be connected to the box 684 with one or more magnetic pins 758 that are inserted into one or more slots 760 disposed in the receiver 752 and the shaft 756 (not shown) of the box blade tool 754. The box blade 680 can include any suitable number of box blade tools 754. Further, the box blade tools 754 can include any suitable tool, e.g., the cutting disc 183 of FIG. 7. In one or more embodiments, the box blade tools 754 can includes at least one of the ground-working tools described herein regarding the tool carousel 104 of implement 100. Other suitable box blade tools 754 include a box blade extension, ripper, disc edger, etc. The box blade tools 754 can be stored on board of the vehicle 500 or separate from the vehicle.

Figure 24:
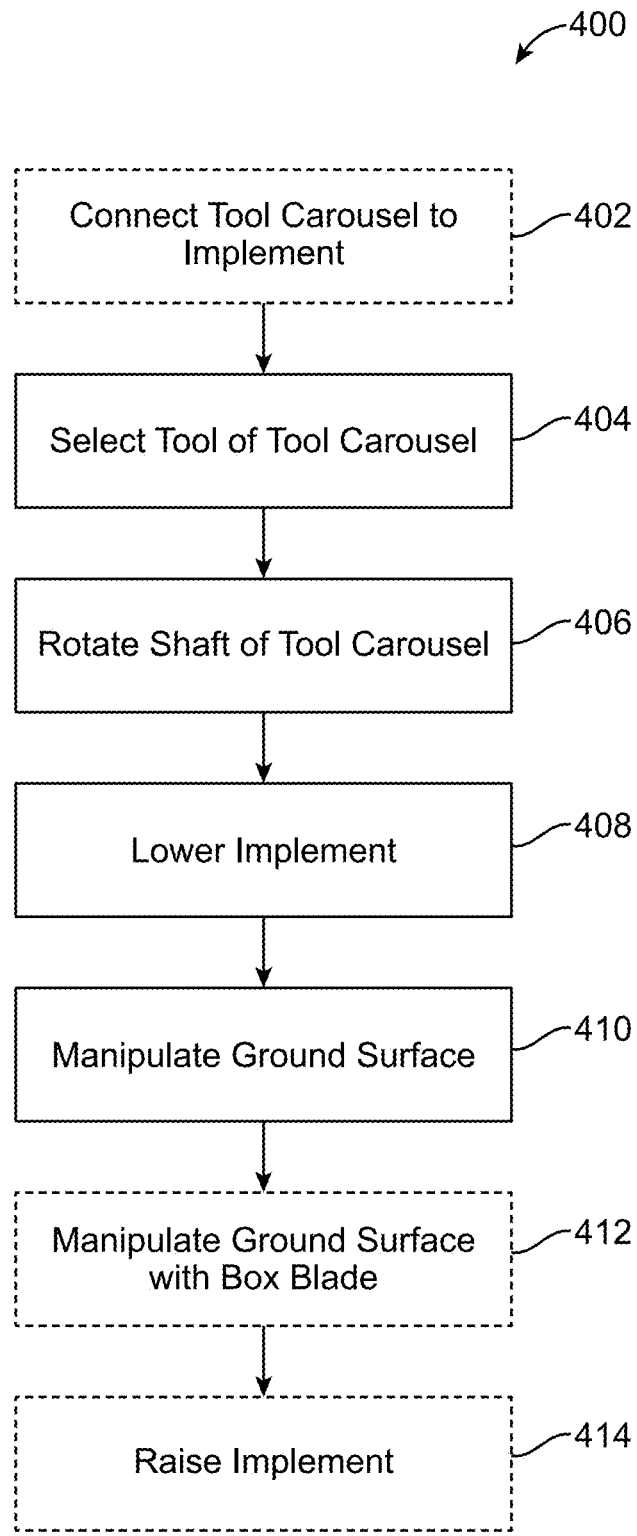
FIG. 24 is a flowchart of one embodiment of a method of utilizing the vehicle of FIG. 1.
Figure 25:
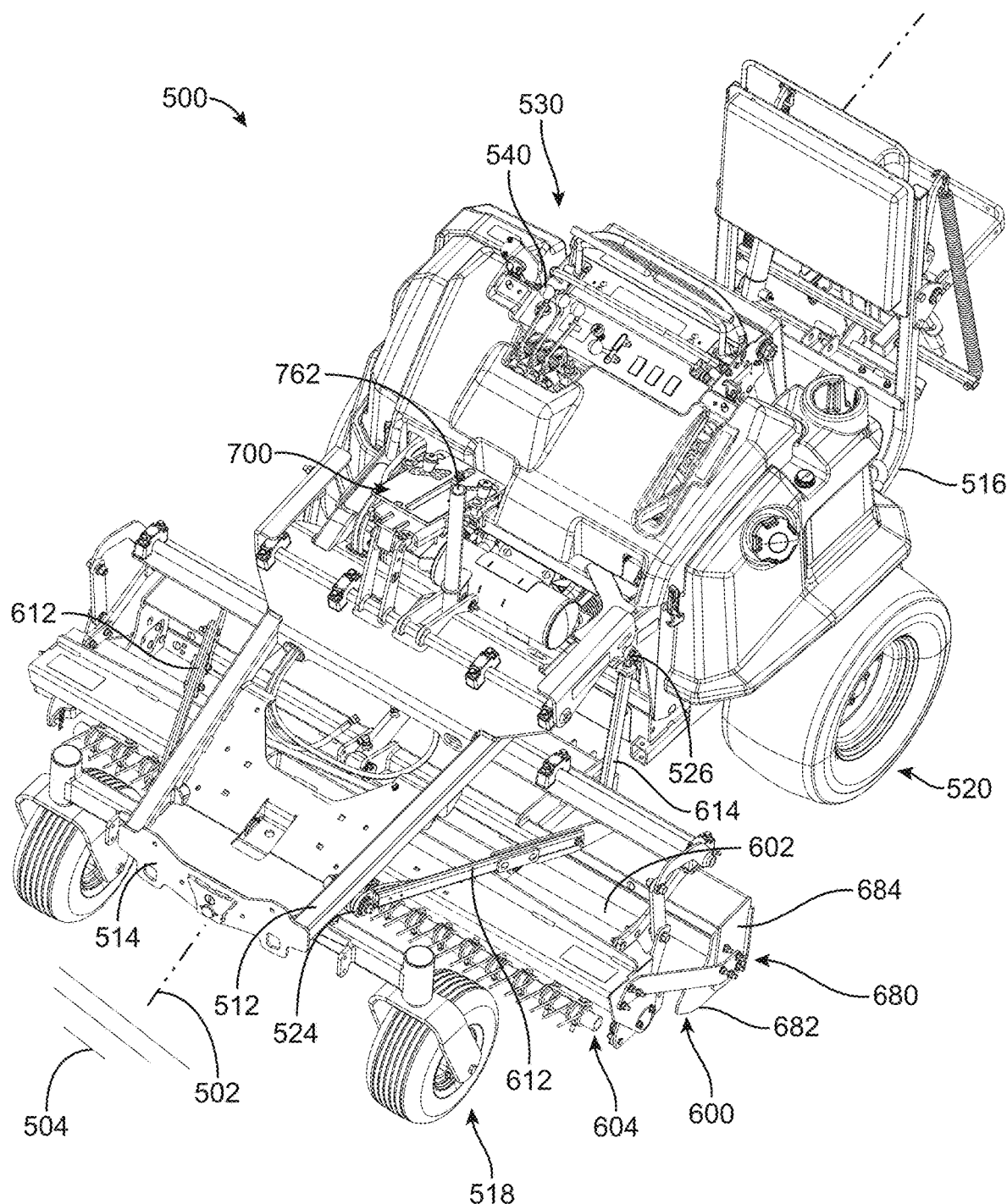
FIG. 25 is a front perspective view of another embodiment of a grounds maintenance vehicle.
Figure 26:
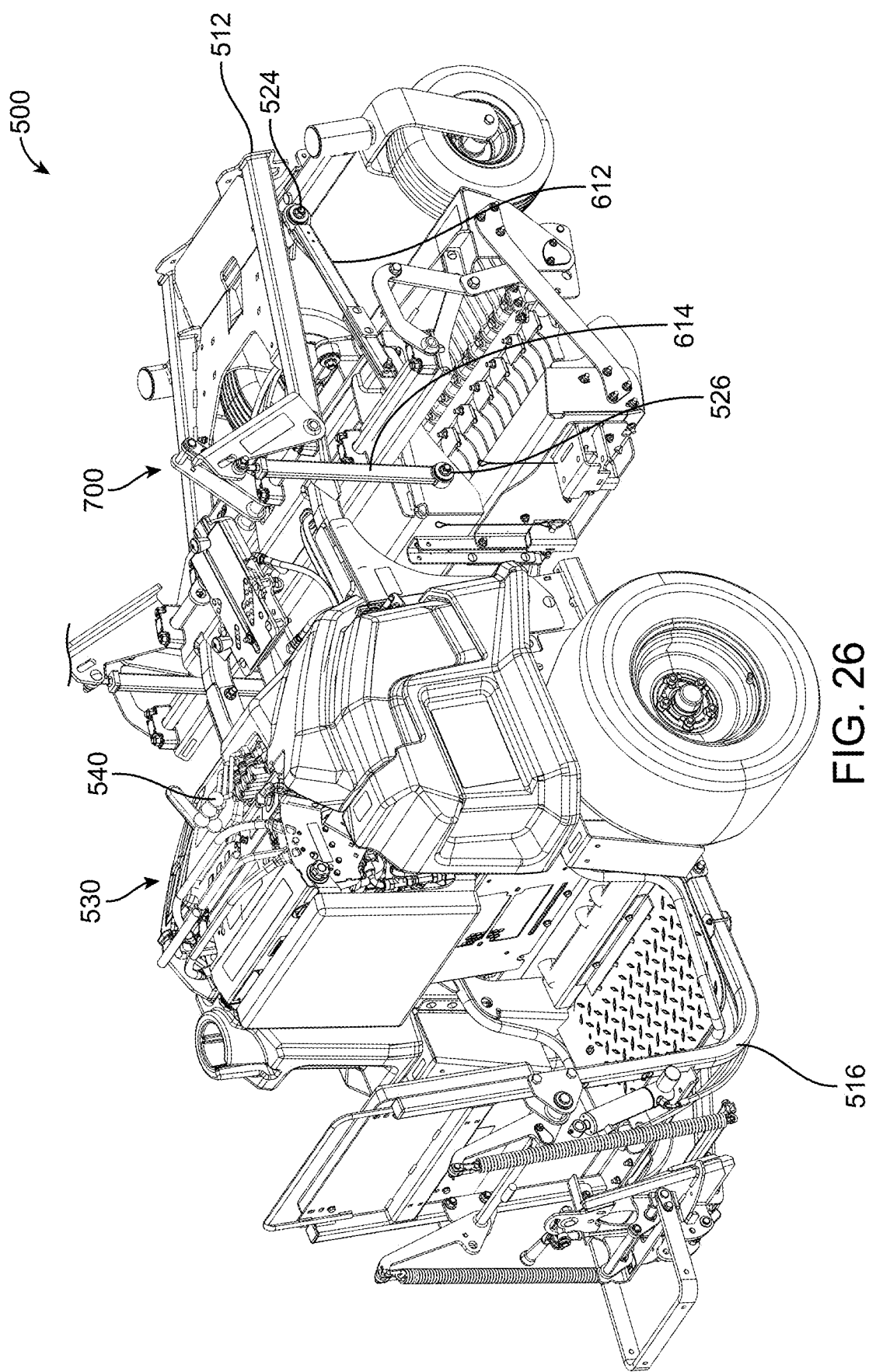
FIG. 26 is a rear perspective view of the grounds maintenance vehicle of FIG. 25.

Any suitable technique or techniques can be selected to utilize the implement 100 of vehicle 10. For example, FIG. 24 is a flowchart of a method 400. Although the method 400 is described regarding grounds maintenance vehicle 10 of FIGS. 1-23, the method can be utilized with any suitable vehicle. The method 400 optionally includes connecting the tool carousel 104 to the implement 100 at 402 using any suitable technique or techniques. In one or more embodiments, the operator can first select a tool carousel 104 having the desired tool or tools prior to utilizing the implement 100 with the vehicle 10. At 404, a tool (e.g., ground-working tools 108, 110, 112) of the tool carousel 104 can be selected using any suitable technique or techniques. For example, the operator can unlock the tool carousel 104 and rotate the carousel until the desired ground-working tool is in place, e.g., the tool carousel can be rotated to lock in a first position, where the first ground-working tool 108 is configured to contact the ground surface 4.

Once the desired ground-working tool is selected, the operator can lock in the tool carousel 104 in a desired orientation using any suitable technique or techniques. In general, the tool carousel 104 can be rotated such that a tool axis of the selected tool forms a selected angle with the ground surface 4 at 406. For example, the tool carousel 104 can lock in the first ground-working tool 108 in a first orientation, were the tine axis 132 of a tine of the plurality of tines 126 extends in a rear direction and forms a first angle $\phi_1$ with the ground surface 4. In one or more embodiments, the operator can manipulate the carousel controller 38 such that the selected ground working tool is in the desired orientation, i.e., the user selects the desired orientation of the tool within the sweep angle of the tool.

At 408, the implement 100 can be lowered using any suitable technique or techniques such that the selected ground-working tool contacts the ground surface 4. For example, the operator can manipulate the pivot controller 40 such that the implement 100 is disposed in the desired orientation relative to the ground surface 4. In one or more embodiments, the operator can manipulate the pivot controller 40 such that the pivot mechanism 200 pivots about the shaft 204. Prior to raising or lowering the implement 100, the operator can select an up stop position utilizing the up stop pin 228 by inserting such pin into the selected slot 227 that corresponds with the desired maximum distance between the implement and the ground surface 4. Further, in one or more embodiments, the operator can select a down stop position by inserting the down stop pin 230 into the desired slot 227 to provide a minimum distance between the implement 100 and the ground surface 4 or a penetration depth of the implement into the ground surface.

Following lowering of the implement 100, the ground surface 4 can be manipulated using the selected ground-working tool of the tool carousel 104 at 410. Optionally, at 412, the ground surface 4 can be manipulated with the box blade 180 of the implement 100 using any suitable technique or techniques. In one or more embodiments, the tool carousel 104 can be manipulated such that it does not contact the ground surface 4 when the box blade 180 is manipulating such surface. Further, in one or more embodiments, both the ground-working tool and the box blade 180 can manipulate the ground surface 4 simultaneously. For example, the first ground-working tool 108 can be configured to break up larger portions of the ground surface 4 while the lower edge 182 of the box blade 180 can smooth the ground surface after it has been manipulated by the first ground-working tool. Further, the operator can raise the implement 100 at 414 using the pivot controller 40 once the ground surface 4 has been manipulated.

The complete disclosure of the patents, patent documents, and publications cited herein are incorporated by reference in their entirety as if each were individually incorporated. If any inconsistency exists between the disclosure of the present application and the disclosure(s) of any document incorporated herein by reference, the disclosure of the present application shall govern.

Illustrative embodiments are described, and reference has been made to possible variations of the same. These and other variations, combinations, and modifications will be apparent to those skilled in the art, and it should be understood that the claims are not limited to the illustrative embodiments set forth herein.

What is claimed is:

1. A grounds maintenance vehicle comprising:
   a chassis comprising a front end, a rear end, and a longitudinal axis extending between the front end and the rear end, wherein the chassis is supported upon a ground surface by at least a front wheel located proximate the front end of the chassis and a rear wheel located proximate the rear end of the chassis; and
   a ground-working implement connected to the chassis between the front and rear wheels, the implement comprising:
      an implement frame; and
      a tool carousel rotatably connected to the implement frame and comprising a shaft and first and second operator-selectable ground-working tools extending outwardly from the shaft, wherein the shaft extends along a carousel axis, and wherein the tool carousel is configured to rotate about the carousel axis and alternately lock in:
         a first position, wherein the first ground-working tool is configured to contact the ground surface, and a second position, wherein the second ground-working tool is configured to contact the ground surface;
wherein the tool carousel is further configured to rotate the first ground-working tool about the carousel axis through a sweep angle that is greater than 0 degrees and no greater than 120 degrees when the tool carousel is in the first position and lock in the first ground-working tool at any sweep angle.

2. The vehicle of claim 1, wherein the implement further comprises a box blade connected to the implement frame, wherein the box blade comprises a lower edge that is configured to contact the ground surface.

3. The vehicle of claim 2, wherein the box blade is configured to be translated along a lateral axis that is in a vertical plane orthogonal to the longitudinal axis.

4. The vehicle of claim 2, wherein the box blade further comprises a box blade tool connected to a box of the box blade by a receiver disposed on the box, wherein the box blade tool is disposed proximate an end of the lower edge.

5. The vehicle of claim 1, wherein the tool carousel is further configured to rotate the second operator-selectable ground working tool about the carousel axis through a sweep angle that is greater than 0 degrees and no greater than 120 degrees when the tool carousel is in the second position and lock in the second ground-working tool at any sweep angle.

6. The vehicle of claim 1, wherein the first operator-selectable ground-working tool comprises a plurality of tines, wherein each tine of the plurality of tines extends radially from the shaft along a tine axis.

7. The vehicle of claim 6, wherein the second operator-selectable ground-working tool comprises a second plurality of tines, wherein each tine of the second plurality of tines extends radially from the shaft along a second tine axis.

8. The vehicle of claim 7, wherein when in the first position the tool carousel is further configured to lock in the first ground-working tool in a first orientation and a second orientation, wherein when in the first orientation the tine axis of at least one tine of the plurality of tines of the first ground-working tool extends in a rear direction and forms a first angle with the ground surface of at least 10 degrees and no greater than 85 degrees, wherein when in the second orientation the tine axis of the at least one tine of the plurality of tines of the first ground-working tool extends in a forward direction and forms a second angle with the ground surface of at least 10 degrees and no greater than 85 degrees.

9. The vehicle of claim 8, wherein when in the first position the tool carousel is further configured to lock in the first ground-working tool in a third orientation, wherein when in the third orientation the tine axis of the at least one tine of the plurality of tines of the first ground-working tool is substantially orthogonal to the ground surface.

10. A ground-working implement comprising:
an implement frame; and
a tool carousel rotatably connected to the implement frame and comprising a shaft and first and second operator-selectable ground-working tools extending outwardly from the shaft, wherein the shaft extends along a carousel axis, and wherein the tool carousel is configured to rotate about the carousel axis and alternately lock in:
a first position, wherein the first ground-working tool is configured to contact a ground surface, and
a second position, wherein the second ground-working tool is configured to contact the ground surface;
wherein the tool carousel is further configured to rotate the first ground-working tool about the carousel axis through a sweep angle that is greater than 0 degrees and no greater than 120 degrees when the tool carousel is in the first position and lock in the first ground-working tool at any sweep angle.

11. The implement of claim 10, further comprising a box blade connected to the implement frame.

12. The implement of claim 11, further comprising a box blade tool connected to a box of the box blade by a receiver disposed on the box, wherein the box blade tool is disposed proximate an end of a lower edge of the box blade.

13. The implement of claim 10, wherein the tool carousel is further configured to rotate the second operator-selectable ground working tool about the carousel axis through a sweep angle that is greater than 0 degrees and no greater than 120 degrees when the tool carousel is in the second position and lock in the second ground-working tool at any sweep angle.

14. The implement of claim 10, wherein each of the first and second ground-working tools comprises a plurality of tines, wherein each tine of the plurality of tines extends along a tine axis that extends radially from the shaft.

15. The implement of claim 14, wherein when in the first position the tool carousel is further configured to lock in the first ground-working tool in a first orientation and a second orientation, wherein when in the first orientation the tine axis of at least one tine of the plurality of tines of the first ground-working tool forms an angle with the ground surface of at least 10 degrees and no greater than 85 degrees.

16. A method comprising:
selecting a ground-working tool of a tool carousel of a ground-working implement, wherein the ground-working tool extends from a shaft of the tool carousel;
rotating the shaft of the tool carousel with a carousel actuator so that a tool axis of the tool forms a selected angle with a ground surface, wherein rotating the shaft of the tool carousel comprises rotating a rotatable shaft about a shaft axis with the carousel actuator that is connected to the rotatable shaft so that a linkage that connects the rotatable shaft to the tool carousel causes the tool carousel to rotate, wherein the rotatable shaft is connected to the implement frame;
lowering the implement such that the tool contacts the ground surface; and
manipulating the ground surface with the tool.

17. The method of claim 16, further comprising manipulating the ground surface with a box blade of the ground-working implement.

18. The method of claim 16, further comprising raising the implement such that the tool does not contact the ground surface.

19. The method of claim 16, further comprising selecting an up stop and a down stop of the implement prior to lowering the implement.

20. The vehicle of claim 1, wherein the ground-working implement further comprises a rotatable shaft connected to the implement frame, wherein the rotatable shaft is connected to the tool carousel by a linkage, wherein a carousel actuator is connected to the rotatable shaft and is configured to rotate the tool carousel about the carousel axis by rotating the rotatable shaft about the shaft axis so that the linkage causes the tool carousel to rotate.

21. The vehicle of claim 1, further comprising an operator control system mounted to the chassis and comprising a tool carousel controller, wherein the operator control system is configured so that an operator of the vehicle utilizes the tool carousel controller to lock the tool carousel in the first position or the second position while the operator is disposed on a platform of the vehicle.

22. The implement of claim 10, further comprising a rotatable shaft connected to the implement frame, wherein the rotatable shaft is connected to the tool carousel by a linkage, wherein a carousel actuator is connected to the rotatable shaft and is configured to rotate the tool carousel about the carousel axis by rotating the rotatable shaft about the shaft axis so that the linkage causes the tool carousel to rotate.

23. The method of claim 16, wherein selecting the ground-working tool comprises rotating the shaft of the tool carousel with the carousel actuator so that the ground-working tool is configured to contact the ground surface.

* * * * *